United States Patent [19]

Bauman

[11] Patent Number: 5,960,455
[45] Date of Patent: Sep. 28, 1999

[54] SCALABLE CROSS BAR TYPE STORAGE CONTROLLER

[75] Inventor: Mitchell A. Bauman, Circle Pines, Minn.

[73] Assignee: Unisys Corporation, Blue Bell, Pa.

[21] Appl. No.: 08/777,038

[22] Filed: Dec. 30, 1996

[51] Int. Cl.⁶ .................................................. G06F 12/08
[52] U.S. Cl. .......................................... 711/120; 711/153
[58] Field of Search .................................... 711/119, 120, 711/130, 147, 148, 150, 153, 173, 129

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 3,872,447 | 3/1975 | Tessera et al. | 340/172.5 |
| 4,056,844 | 11/1977 | Izumi | 364/200 |
| 4,070,704 | 1/1978 | Calle et al. | 364/200 |
| 4,130,865 | 12/1978 | Heart et al. | 364/200 |
| 4,245,306 | 1/1981 | Besemer et al. | 364/200 |
| 4,349,871 | 9/1982 | Lary | 364/200 |
| 4,426,681 | 1/1984 | Bacot et al. | 364/200 |
| 4,437,157 | 3/1984 | Witalka et al. | 364/200 |
| 4,442,487 | 4/1984 | Fletcher et al. | 364/200 |
| 4,445,174 | 4/1984 | Fletcher | 364/200 |
| 4,521,851 | 6/1985 | Trubisky et al. | 364/200 |
| 4,525,777 | 6/1985 | Webster et al. | 364/200 |
| 4,551,799 | 11/1985 | Ryan et al. | 364/200 |
| 4,586,133 | 4/1986 | Steckler | 364/200 |
| 4,667,288 | 5/1987 | Keeley et al. | 364/200 |
| 4,701,844 | 10/1987 | Thompson et al. | 364/200 |
| 4,707,784 | 11/1987 | Ryan et al. | 364/200 |
| 4,719,568 | 1/1988 | Carrubba et al. | 364/200 |
| 4,755,930 | 7/1988 | Wilson, Jr. et al. | 364/200 |
| 4,761,755 | 8/1988 | Ardini, Jr. et al. | 364/749 |
| 4,794,521 | 12/1988 | Ziegler et al. | 364/200 |
| 4,807,110 | 2/1989 | Pomerene et al. | 364/200 |
| 4,843,541 | 6/1989 | Bean et al. | 364/200 |
| 4,843,542 | 6/1989 | Dashiell et al. | 364/200 |
| 4,860,192 | 8/1989 | Sachs et al. | 364/200 |
| 4,868,818 | 9/1989 | Madan et al. | 371/11.3 |
| 4,888,771 | 12/1989 | Benignus et al. | 371/16.1 |

(List continued on next page.)

OTHER PUBLICATIONS

Dubois et al., "Effects of Cache Coherency in multiprocessors", *IEEE Transactions on Computers*, vol. C–31, No. 11, Nov. 1982, pp. 1083–1099.

Wilson, Jr., "Hierarchical Cache/Bus Architecture for Shared Memory Multiprocessors", *IEEE*, 1987, pp. 244–252.

Sparacio, "Data Processing System With Second Level Cache", *IBM Technical Disclosure Bulletin*, vol. 21, No. 6, Nov. 1978, pp. 2468–2469.

Myers et al., *The 80960 Microprocessor Architecture*, 1988, pp. 159–183.

Hinton et al., "Microarchitecture of the 80960 High–Integration Processors", Proceedings of the 1988 IEEE International Conference on Computer Design: VLSI in Computers and Processors—ICCD, 1988, pp. 362–365.

Bandyopadhyay et al., "Combining Both Micro–Code and Hardwired Control in RISC", *Computer Architecture News*, 1990, pp. 11–15.

Bandyopadhyay et al., "Micro–Code Based RISC Architecture", 19th Southeastern Symposium on System Theory, Mar. 1987, pp. 411–414.

*Primary Examiner*—Eddie P. Chan
*Assistant Examiner*—Gary J. Portka
*Attorney, Agent, or Firm*—Charles A. Johnson; Mark T. Starr; Nawrocki, Rooney & Sivertson, P.A.

[57] ABSTRACT

Method and apparatus for a computer system to efficiently operate with multiple instruction processors and input/output subsystem in a symmetrical multi-processing environment. The computer system uses a new storage controller having a high performance interconnect scheme that scales in system performance as additional common storage controller modules are added. The interconnect scheme has the cost advantage of a bus connected system while achieving the performance characteristics of a crossbar connected system.

34 Claims, 20 Drawing Sheets

U.S. PATENT DOCUMENTS

| | | | |
|---|---|---|---|
| 4,891,810 | 1/1990 | de Corlieu et al. | 371/9.1 |
| 4,979,107 | 12/1990 | Advani et al. | 364/200 |
| 4,984,153 | 1/1991 | Kregness et al. | 364/200 |
| 4,985,829 | 1/1991 | Thatte et al. | 364/200 |
| 4,992,930 | 2/1991 | Gilfeather et al. | 364/200 |
| 4,992,934 | 2/1991 | Portanova et al. | 364/200 |
| 4,995,035 | 2/1991 | Cole et al. | 370/95.2 |
| 5,014,197 | 5/1991 | Wolf | 364/200 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,029,070 | 7/1991 | McCarthy et al. | 364/200 |
| 5,043,874 | 8/1991 | Gagliardo et al. | 711/119 |
| 5,058,006 | 10/1991 | Durdan et al. | 364/200 |
| 5,095,424 | 3/1992 | Woffinden et al. | 395/425 |
| 5,136,696 | 8/1992 | Beckwith et al. | 395/375 |
| 5,148,533 | 9/1992 | Joyce et al. | 395/425 |
| 5,193,163 | 3/1993 | Sanders et al. | 395/425 |
| 5,197,139 | 3/1993 | Emma et al. | 395/400 |
| 5,206,945 | 4/1993 | Nishimukai et al. | 395/425 |
| 5,212,781 | 5/1993 | Shah | 395/425 |
| 5,222,224 | 6/1993 | Flynn et al. | 395/425 |
| 5,222,244 | 6/1993 | Carbine et al. | 395/800 |
| 5,241,641 | 8/1993 | Iwasa et al. | 395/425 |
| 5,265,232 | 11/1993 | Gannon et al. | 395/425 |
| 5,265,235 | 11/1993 | Sindhu et al. | 395/425 |
| 5,276,848 | 1/1994 | Gallagher et al. | 395/425 |
| 5,307,477 | 4/1994 | Taylor et al. | 395/425 |
| 5,313,602 | 5/1994 | Nakamura | 395/425 |
| 5,355,467 | 10/1994 | MacWilliams et al. | 395/425 |
| 5,359,723 | 10/1994 | Matthews et al. | 395/425 |
| 5,386,547 | 1/1995 | Jouppi | 395/425 |
| 5,392,416 | 2/1995 | Doi et al. | 395/425 |
| 5,423,016 | 6/1995 | Tsuchiya et al. | 395/425 |
| 5,490,261 | 2/1996 | Bean et al. | 395/448 |
| 5,519,846 | 5/1996 | Swenson | 711/130 |
| 5,524,233 | 6/1996 | Milburn et al. | 395/468 |
| 5,555,382 | 9/1996 | Thaller et al. | 395/293 |
| 5,574,944 | 11/1996 | Stager | 711/153 |
| 5,577,259 | 11/1996 | Alferness et al. | 395/800 |
| 5,603,005 | 2/1997 | Bauman et al. | 395/451 |

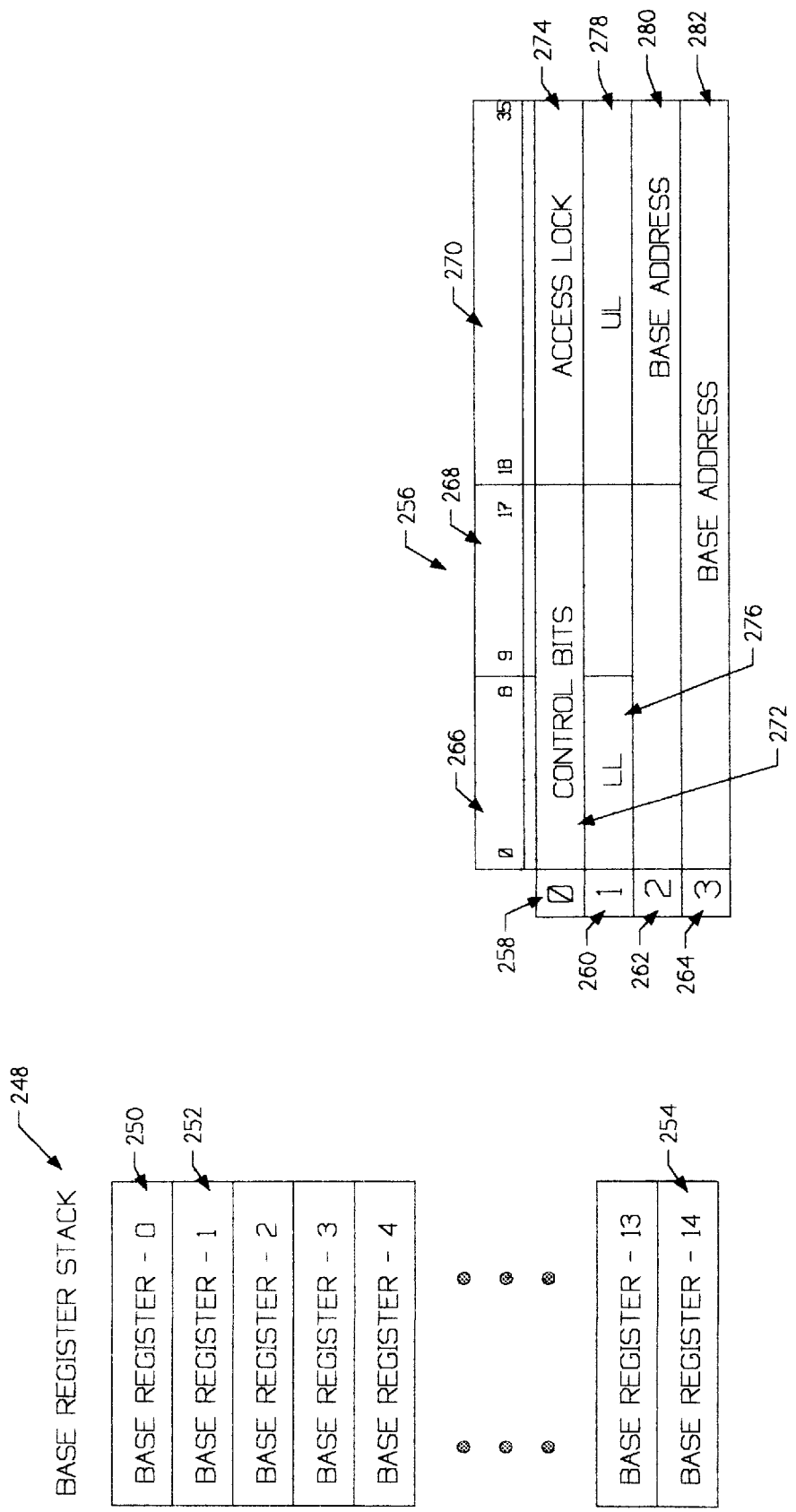

| F0 | F1 | F2 | F3 | A27 | A28 | A | 37 | A38 | A39 | A40 | A41 | A | 42 | A43 | A44 | A45 | A46 | A47 | A48 | A49 | A50 | A51 | FIRST CYCLE ← 1066 |
|----|----|----|----|-----|-----|---|----|-----|-----|-----|-----|---|----|-----|-----|-----|-----|-----|-----|-----|-----|-----|---|
| F4 | F5 | F6 | A21 | A22 | A23 | A24 | A25 | A26 | 0 | A29 | A30 | A31 | A32 | A33 | A34 | A35 | A36 | 0 | A52 | A53 | | | SECOND CYCLE ← 1068 |

SCALABLE CROSS BAR TYPE STORAGE CONTROLLER

CROSS REFERENCE TO CO-PENDING APPLICATIONS

The present application is related to U.S. patent application Ser. No. 08/748,772, filed Nov. 4, 1996, entitled "Selectable Two-Way, Four-Way Double Cache Interleave Scheme", U.S. patent application Ser. No. 08/579,683, filed Dec. 28, 1995, entitled "Multi-Processor Data Processing System With Multiple, Separate Instruction and Operand Second Level Caches", U.S. patent application Ser. No. 07/762,282, filed Sep. 19, 1991, entitled "Cooperative Hardware and Microcode Control System for Pipelined Instruction Execution" now U.S. Pat. No. 5,577,259, and U.S. patent application Ser. No. 07/762,276, filed Sep. 19, 1991, entitled "Data Coherency Protocol for Multi-Level Cached High Performance Multiprocessor System", all assigned to the assignee of the present invention and all incorporated herein by reference.

BACKGROUND OF THE INVENTION

1. Field of the Invention

The present invention relates to general purpose digital data processing systems, and more particularly, to such systems that employ one or more storage controllers shared amongst multiple instruction processors and input/output processors in a multi-processor system.

2. Description of the Prior Art

In most general purpose digital computers, it is desirable to have a computer system which may efficiently operate with multiple instruction processors and input/output processors in a multi-processing environment. In particular, it is desirable that storage controllers be used which may be shared amongst multiple instruction processors and input/output processors in symmetrical multi-processor systems. It is therefore desirable to have a storage controller which uses an interconnect scheme that scales in system performance as the number of common storage controllers are increased.

One approach to solve this problem uses storage controllers connected to a bi-directional system bus. The system may have four storage controllers, with each storage controller containing a dedicated second level cache, an input/output processor, and four main storage units. The instruction processors may be connected to the storage controllers via separate address and data lines. With this approach, the system bus interconnects all of the storage controllers, I/O processors, and memory storage units together in a coherent symmetrical multi-processing system. This approach has the advantage of being a very cost-effective method of interconnecting the multi-processor computing system. To improve system performance, more storage controller and instruction processor modules may be added. Memory storage unit modules may be added to increase the size of memory available to the system. In addition, I/O modules may be added to a back plane that contains the system bus interconnection. Unfortunately, a significant disadvantage with this approach is that the system bus may become overloaded with activity for applications that share a lot of data, such as transaction environments. In addition, system performance may not scale linearly as additional components are added. Therefore, this type of system is best suited for low cost and low performance applications.

Another approach which has been used to solve this problem is to directly employ the storage controller as the interconnect amongst various system modules. With this approach, all instruction processors and I/O may access directly each second level cache segment, and each second level cache segment is mapped to one of the memory storage units. This approach has better performance characteristics in transaction environments than the previous approach because the shared data is directly and readily accessible to all instruction processors and I/O via the storage controller. In addition, because the system interconnect is based on logical interconnection within the storage controller, rather than on the back plane interconnection of the previous approach, there is significantly more parallelism available with this approach. Unfortunately, this type of system interconnect which is based on logical interconnection within the storage controller has higher cost due to the relatively more complex design of the storage controller. In addition, this type of interconnect lacks component scalability, thus potentially limiting maximum performance. Furthermore, lower performance systems, such as those with one or two instruction processors, have the full cost burden of the maximum size storage controller utilizing up to four instruction processors. Unfortunately, this type of interconnection scheme is not cost-effective for systems requiring only low levels of performance. For example, in a 1× system, the storage controller would have to maintain the overhead cost of three unused instruction processor/storage controller interfaces. In addition, this approach would have excessive second level cache capacity that while being used, would not be as cost and performance effective as it would have been if used in a larger processing system.

SUMMARY OF THE INVENTION

The present invention overcomes the disadvantages found in the prior art by providing a method and apparatus for a computer system to efficiently operate with multiple instruction and input/output processors in a symmetrical multi-processor environment. The computer system uses a new storage controller having a high performance interconnect scheme that scales in performance as additional common storage controller modules are added. The interconnect scheme has the cost advantage of a bus connected system while achieving the performance characteristics of a cross-bar connected system.

In an exemplary embodiment of the present invention, the storage control module is configured in the entry-level (EC) configuration. This 2× configuration may comprise two instruction processors, an input/output subsystem, two memory storage units and an interface to a remote storage controller. The storage controller may have a single storage control module 0 having independent second level cache segments comprising segments 0 and 1. Storage control module 0 may have storage data ASIC 0, storage data ASIC 1 and storage address ASIC 0. Storage data ASIC 0, storage data ASIC 1 and storage address ASIC 0 may each be implemented on an application specific integrated circuit (ASIC). Storage data ASIC 0 and storage data ASIC 1 may have the same physical design, and contain data logic and cache memory. Storage address ASIC 0 may contain the second level cache tag memory and control logic.

In the exemplary embodiment, storage data ASIC 0 and storage data ASIC 1 may each contain two second level cache data segments, second level cache data segment 0 and second level cache data segment 1, which are independent and may operate in parallel. Each data segment is controlled independently via control lines from storage address ASIC 0. Each storage data ASIC may consist of two quarter word write and two quarter word read interface for each of the two instruction processors, a one-quarter word write and one quarter word read interface for the input/output subsystem, two quarter word write and two quarter word read interfaces for the remote storage controller, a quarter word combination write and address interface to the memory storage units, and a half word read interface from the memory storage units. Furthermore, storage address ASIC 0 may have two request interfaces for the two instruction processors which comprises address, function and control signals. Storage address ASIC 0 may also have a request interface for the Input/output subsystem. In addition, storage address ASIC 0 may have a remote interface to a remote storage controller.

In the exemplary embodiment, a maintenance system statically scans configuration information to storage data ASICs 0 and 1 and storage address ASIC 0 to indicate that a 2× configuration is being used. The maintenance system also scans into storage address ASIC 0 an identification number indicating which address range storage address ASIC 0 must respond to. In the EC configuration, the address may be divided into two segments, wherein 2-way interleave address mapping may be used. With the 2× system, storage address ASIC 0 has two second level cache tag memories wherein each of the tag memories corresponds to a particular one of two memory segments. The second level cache tag memories may be accessed to determine if the requested data is contained within one of the corresponding second level cache data segment blocks. In the exemplary embodiment, second level cache data segment 0 covers one-half of the address range, while second level cache data segment 1 covers the other half. A portion of the address (referred to as the block address) may be presented to one of the two second level cache tag memories, depending on the segment being accessed. A cache hit occurs if an address matching the block address is contained within the segment tag memory, and a cache miss occurs if an address matching the block address is not contained within the segment tag memory. Storage address ASIC 0 may have second level cache tag segment 0 and second level cache tag segment 1, which correspond to second level cache data segment 0 and second level cache data segment 1, respectively.

In the exemplary embodiment, storage address ASIC 0 receives a request and an address from a requestor. Storage address ASIC 0 determines, based on the configuration, which one of the two second level cache segments is being requested. If the request is for an address within segment 0 or segment 1, either second level cache tag segment 0 or second level cache tag segment 1 within storage address ASIC 0 will be accessed. Storage address ASIC 0 has two sets of control lines, each control line coupling to the two storage data ASICs. Thus, once storage address ASIC 0 receives a request, the exact same information is driven on both sets of control lines to storage data ASICs 0 and 1. The second level cache data segment 0 and second level cache data segment 1 blocks within each storage data ASIC are assigned particular address locations on the basis of configuration information scanned in during initialization. Thus, both second level cache data segment 0 blocks within storage data ASIC 0 and both second level cache data segment 0 blocks within storage data ASIC 1, or conversely, both second level cache data segment 1 blocks with storage data ASIC 0 and both second level cache data segment 1 blocks within storage data ASIC 1, will be accessed, depending on whether the request received by storage address ASIC 0 was to an address location within segment 0 or within segment 1. Both second level cache data segment blocks within storage data ASIC 0 and storage data ASIC 1, are accessed simultaneously, as a single second level cache segment. The control information sent from storage address ASIC 0 to storage data ASIC 0 and storage data ASIC 1 indicates to the second level cache data segment 0 and second level cache data segment 1 blocks within storage data ASIC 0 and storage data ASIC 1 which interface to retrieve data from for write operations, or conversely, which interface to route the data to for read operations. Thus when storage address ASIC 0 receives a request and an address from a requester such as one of the two instruction processors, the input/output subsystem, or from a remote storage controller, a determination is made as to which of the two second level cache segments, either segment 0 or segment 1, is being requested. Storage address ASIC 0 may access the appropriate second level cache tag based on this segment. If a cache hit occurs, the data is retrieved from either the corresponding second level cache data segment 0 or the second level cache data segment 1 blocks within storage data ASIC 0 or, storage data ASIC 1, depending upon which second level cache tag was accessed.

In the exemplary embodiment, if an instruction processor is performing a read operation from second level cache data segment 0, storage address ASIC 0 would send the address and control information to both storage data ASIC 0 and storage data ASIC 1 via two of the four control interfaces. Both second level cache data segment 0 blocks within storage data ASIC 0 and within storage data ASIC 1 would be accessed. In addition, the control information would indicate to storage data ASIC 0 and storage data ASIC 1 which read data interface to route the read result to. That is, each of the two control interfaces from storage address ASIC 0 indicates to one of the two second level cache data segment 0 blocks within storage data ASIC 0 and storage data ASIC 1, which of the two one-quarter word read data interfaces to route the read data to. As a result, storage data ASIC 0 may output one-half of the required one word of read data, and storage data ASIC 1 may output the other half of the required one word of read data.

In the preferred embodiment of the present invention, the storage control module is configured in the maximum-level (MC) configuration. This 4× configuration may comprise two storage controllers, with each storage controller having four instruction processors, an input/output subsystem, and two memory storage units. In comparison to the 2× system, there are now two storage control modules, storage control module 0 and storage control module 1, two additional storage data ASICs, and an additional storage address ASIC. In the 4× configuration, storage control module 0 has storage data ASIC 0, storage data ASIC 1 and storage address ASIC 0, and storage controller module 1 has storage data ASIC 2, storage data ASIC 3 and storage address ASIC 1. Storage data ASIC 0, storage data ASIC 1, storage data ASIC 2 and storage data ASIC 3 each have the same physical design, just as with the 2× configuration. Storage address ASIC 0 and storage address ASIC 1 also have the same physical design.

In the preferred embodiment, each storage data ASIC may consist of a quarter word write and a quarter word read interface for each of the four instruction processors, a one-quarter word write and one quarter word read interface for the input/output processor, a quarter word write and a quarter word read interface for each of two remote storage controllers, a quarter word combination write and address interface to the memory storage units, and a half word read interface from the memory storage units. Furthermore, storage address ASIC 0 and storage address ASIC 1 may each have four request interfaces for the four instruction processors and a request interface for the I/O subsystem. In addition, storage address ASIC 0 has a remote interface to a remote storage controller, and storage address ASIC 1 has a remote interface to a second remote storage controller.

In the preferred embodiment, a maintenance system statically scans configuration information to storage data ASICs 0 through 3 and storage address ASICs 0 and 1, to indicate that a 4× configuration is being used. The maintenance system also scans an identification number into storage address ASIC 0 and storage address ASIC 1 indicating which address range storage address ASIC 0 and storage address ASIC 1 must respond to. In the MC configuration, the address may be divided into four segments, wherein 4-way interleave address mapping may be used. Thus, with the 4× system, storage address ASIC 0 and storage address ASIC 1 each have two second level cache tag memories wherein each of the tag memories corresponds to a particular one of the four memory segments. The second level cache tag memories may be accessed to determine if the requested data is contained within one of the second level cache data segment 0–3 blocks. The block address may be presented to one of the four second level cache tag memories, depending on the segment being accessed. A cache hit occurs if an address matching the block address is contained within the segment tag memory, and a cache miss occurs if an address matching the block address is not contained within the segment tag memory. Storage address ASIC 0 may have second level cache tag segment 0 and second level cache tag segment 2 corresponding to memory segment 0 and 2, respectively. Storage address ASIC 1 may have second level cache tag segment 1 and second level cache tag segment 3, corresponding to memory segments 1 and 3, respectively.

In the preferred embodiment, both storage address ASIC 0 and storage address ASIC 1 receive a request and an address from a requestor. Storage address ASIC 0 and storage address ASIC 1 determine, based on the configuration, which one of the four second level cache segments is being requested. If the request is for an address within segment 0 or segment 2, either second level cache tag segment 0 or second level cache tag segment 2 within storage address ASIC 0 will be accessed. If the request is for an address within segment 1 or segment 3, either second level cache tag segment 1 or second level cache tag segment 3 within storage address ASIC 1 will be accessed. In the preferred embodiment, storage address ASICs 0 and 1 each have two sets of control lines, each control line coupling to two storage data ASICs. A first pair of control lines from storage address ASIC 0 and storage address ASIC 1 couple to both storage data ASIC 0 and storage data ASIC 1. A second set of control lines from storage address ASIC 0 and storage address ASIC 1 couple to both storage data ASIC 2 and storage data ASIC 3. Thus, once the storage data ASIC receives a request, the exact same information is driven on both sets of control lines to storage data ASICs 0 through 3. The control lines, which comprise address and function information, control the second level cache data segments contained within storage data ASICs 0 through 3. The second level cache data segments within each of storage data ASICs 0 through 3 include a second level cache data segment 0 block, a second level cache data segment 1 block, a second level cache data segment 2 block, and a second level cache data segment 3 block.

In the preferred embodiment, if an instruction processor presents a request for an address contained within segment 0, then storage address ASIC 0 would route the address and control information to storage data ASIC 0 and storage data ASIC 1 on the first pair of control lines, and to storage data ASIC 2 and storage data ASIC 3 on the second pair of control lines, if the second level cache tag segment 0 indicates the data is available within storage data ASICs 0 through 3. Thus, the second level cache data segment 0 block within each of storage data ASICs 0 through 3 would be accessed, and the route information sent would indicate to each of storage data ASIC 0 through 3 to route the requested data to the one-quarter word read data interface corresponding to the instruction processor making the request. As a result, each of the four storage data ASICs, storage data ASICs 0 through 3, provide one-fourth of the required one word interface. Thus, in comparison to the 2× configuration, each of storage data ASICs 0 through 3 provide one-fourth of the required interface (as opposed to one-half of the required interface for the 2× system). Therefore, the performance of the interface has scaled as additional instruction processors and storage controller modules were added.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 9 shows an exemplary base register stack;

FIG. 10 shows a typical base register entry;

FIG. 17 is a diagram showing the instruction processor to storage controller address format;

DETAILED DESCRIPTION OF THE PREFERRED EMBODIMENTS

Figure 1:
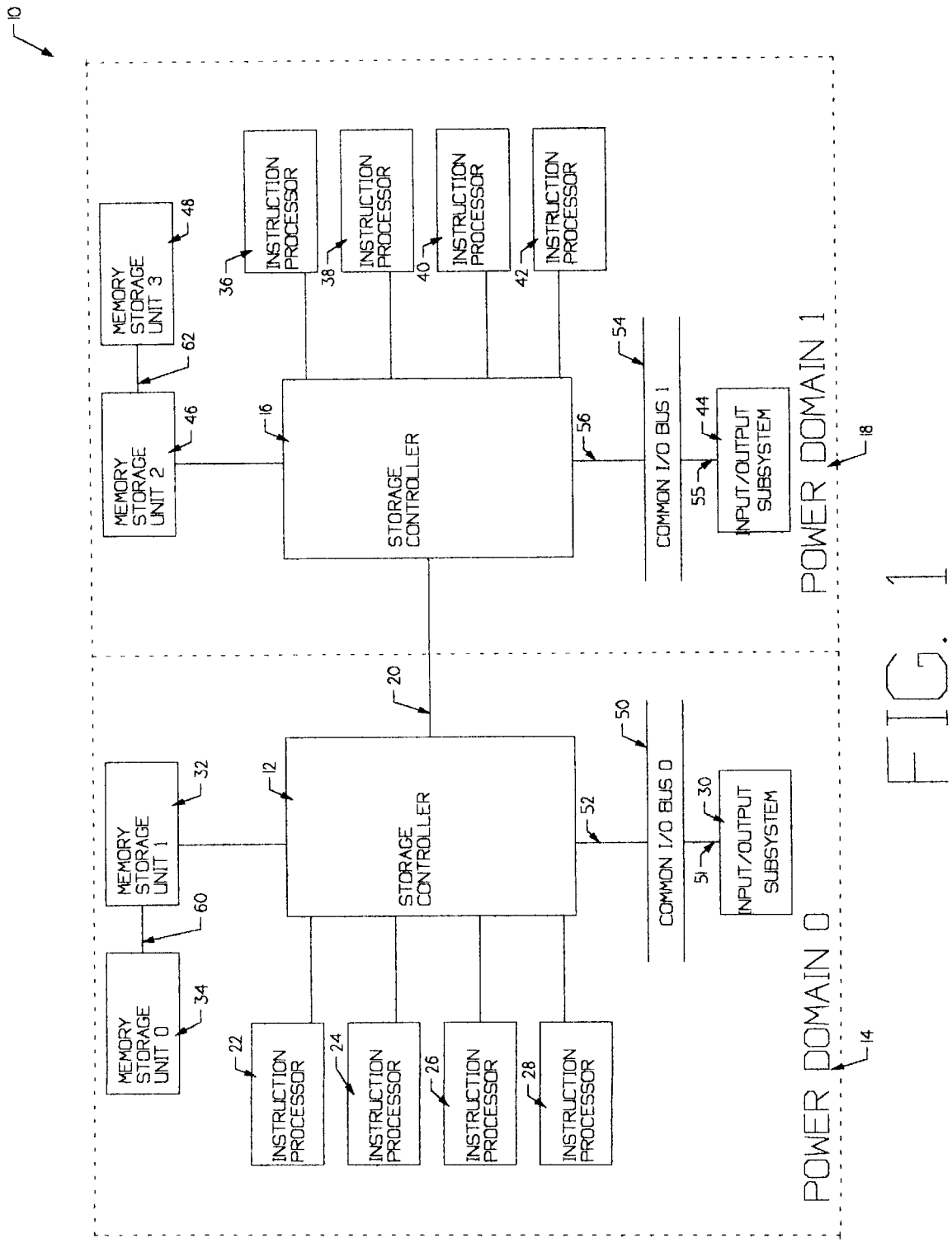
FIG. 1 is a schematic diagram of a fully populated data processing system incorporating the present invention.

FIG. 1 is an overall diagram of fully populated data processing system 10 according to the present invention. Data processing system 10 includes two individual processing clusters each contained within its own power domain. Furthermore, each individual processing cluster has its own storage controller and point-to-point communication with the other cluster via a storage controller-to-storage controller interface.

Storage controller 12 is contained within power domain 0-14, and storage controller 16 is contained within power domain 1-18. Storage controller 12 is coupled to storage controller 16 via interface 20. Storage controller 12 is fully populated with instruction processor 22, instruction processor 24, instruction processor 26, instruction processor 28, input/output subsystem 30, main memory module 32 and main memory module 34. Storage controller 16 is fully populated with instruction processor 36, instruction processor 38, instruction processor 40, instruction processor 42, input/output subsystem 44, main memory module 46 and main memory module 48. Storage controller 12 is coupled to common I/O bus 50 via path 52, and the common I/O bus 50 is coupled to input/output subsystem 30 via path 51. Storage controller 16 is coupled to common I/O bus 54 via path 56, and the common I/O bus 54 is coupled to input/output subsystem 44 via path 55. Main memory module 32 is coupled to main memory module 34 vial path 60. Main memory module 46 is coupled to main memory module 48 via path 62. Each of instruction processors 22, 24, 26 and 28 (along with similar instruction processors 36, 38, 40, and 42) has internal dedicated cache resources in the form of an instruction cache and an operand cache. These elements, along with the associated data invalidity logic, are described in more detail below. A more general description of the construction and operation of instruction processors 22, 24, 26 and 28 (along with similar instruction processors 36, 38, 40, and 42) may be found in the above-referenced and commonly assigned co-pending U.S. patent applications which have been incorporated by reference.

Input/output subsystem 30 may consist of an I/O bridge, plus other I/O channels like Input/Output processors and channel modules currently available, such as found in the Unisys 2200/600 series. Input/Output subsystem 44 may be similarly configured. Main memory storage units 32, 34, 46, and 48 are specific to the Unisys ITASCA Model series.

Figure 2:
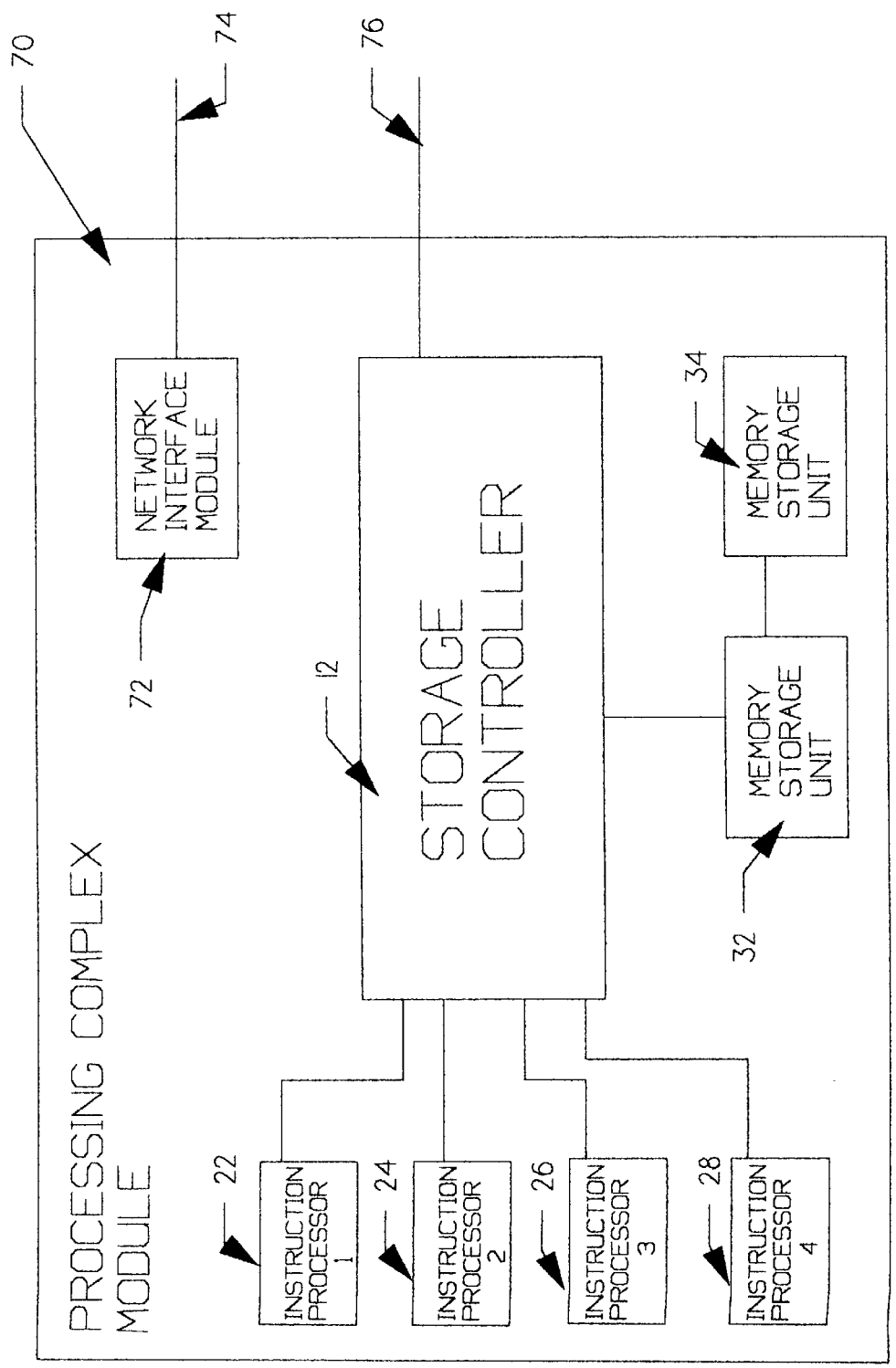
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Module, PCM 70. Within fully populated PCM 70 is located instruction processors 22, 24, 26 and 28 (i.e., IP 1, IP 2, IP 3 and IP 4). In the preferred mode, each of these instruction processors is packaged on a single high density circuit board. The memory storage units 32 and 34 are coupled to storage controller 12 as explained above.

Network interface module (i.e., NIM) 72 provide an interface to the operator console via interface 74. Interface 76 couples input/output subsystem 30 (see also, FIG. 1) to storage controller 12. Input/output processors are physically packaged in an Input/output Complex Module (i.e., ICM) which is not shown for clarity. Other referenced elements are as previously described.

Figure 3:
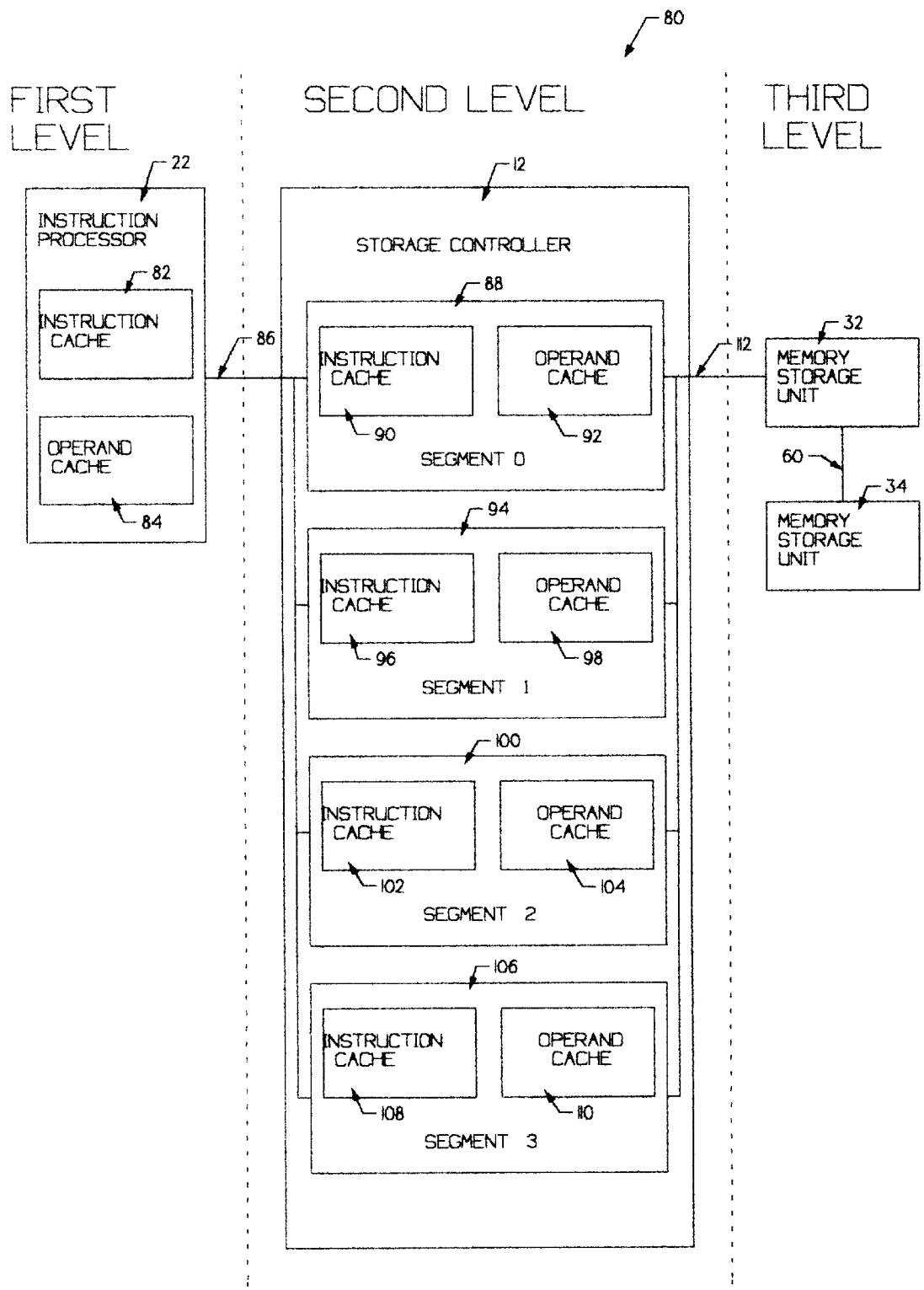
FIG. 3 is a schematic diagram of the levels of storage for a single instruction processor.

FIG. 3 is a diagram 80 showing the hierarchical arrangement of the three levels of storage within data processing system 10. Instruction processor 22 is within the first level of storage and contains an instruction cache 82 and an operand cache 84, each storing 8k of 36-bit words. These are internal to instruction processor 22 and dedicated to the operations undertaken therein. By partitioning the internal dedicated cache resources in this manner, there is a certain concurrence of cache accesses associated with normal instruction execution.

Upon the request of instruction processor 22 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 86 for the block of eight 36-bit words containing the desired data element. A more detailed explanation of the operation of instruction cache 82 and operand cache 84 is found below.

Storage controller 12 is within the second level of storage. The storage controller contains multiple segments wherein each segment contains a 128k 36-bit word instruction cache and a 32k 36-bit words operand cache. In the present illustration, second level cache segment 0-88 has instruction cache 90 and operand cache 92, second level cache segment 1-94 has instruction cache 96 and operand cache 98, second level cache segment 2-100 has instruction cache 102 and operand cache 104, and second level cache segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106 to determine if the desired data element is present and valid. Each of the instruction and operand cache memories within second level cache segment 0-88, second level cache segment 1-94, second level cache segment 2-100 or second level cache segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106 (depending upon the requested address), the data will then be requested from the third level of storage. Storage controller 12 is coupled to memory storage units 32 and 34 in the third level of storage via interface 112. In the preferred mode, memory storage units 32 and 34 each contain up to 256 meg. words of storage.

Each data element request to storage controller 12 is made through a separate interface. For a fully populated system, this includes four instruction processors, one input/output processor, and one other storage controller (see also, FIG. 1).

Figure 4:
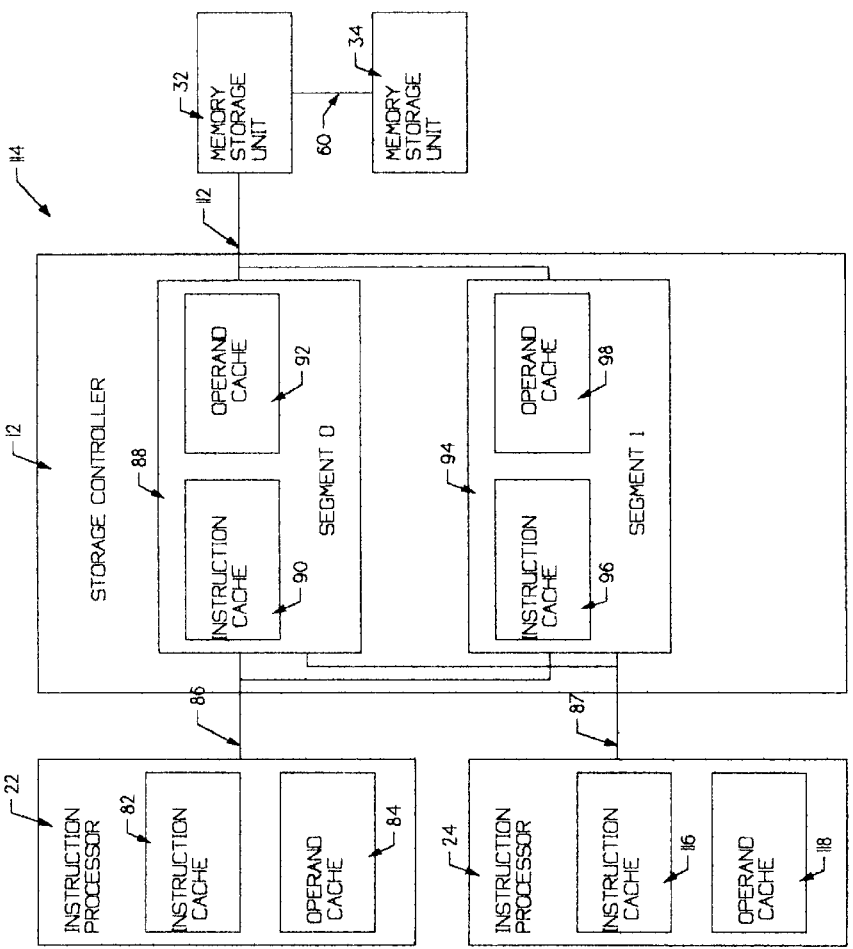
FIG. 4 is a schematic diagram showing the entry-level (EC) configuration.
Figure 5:
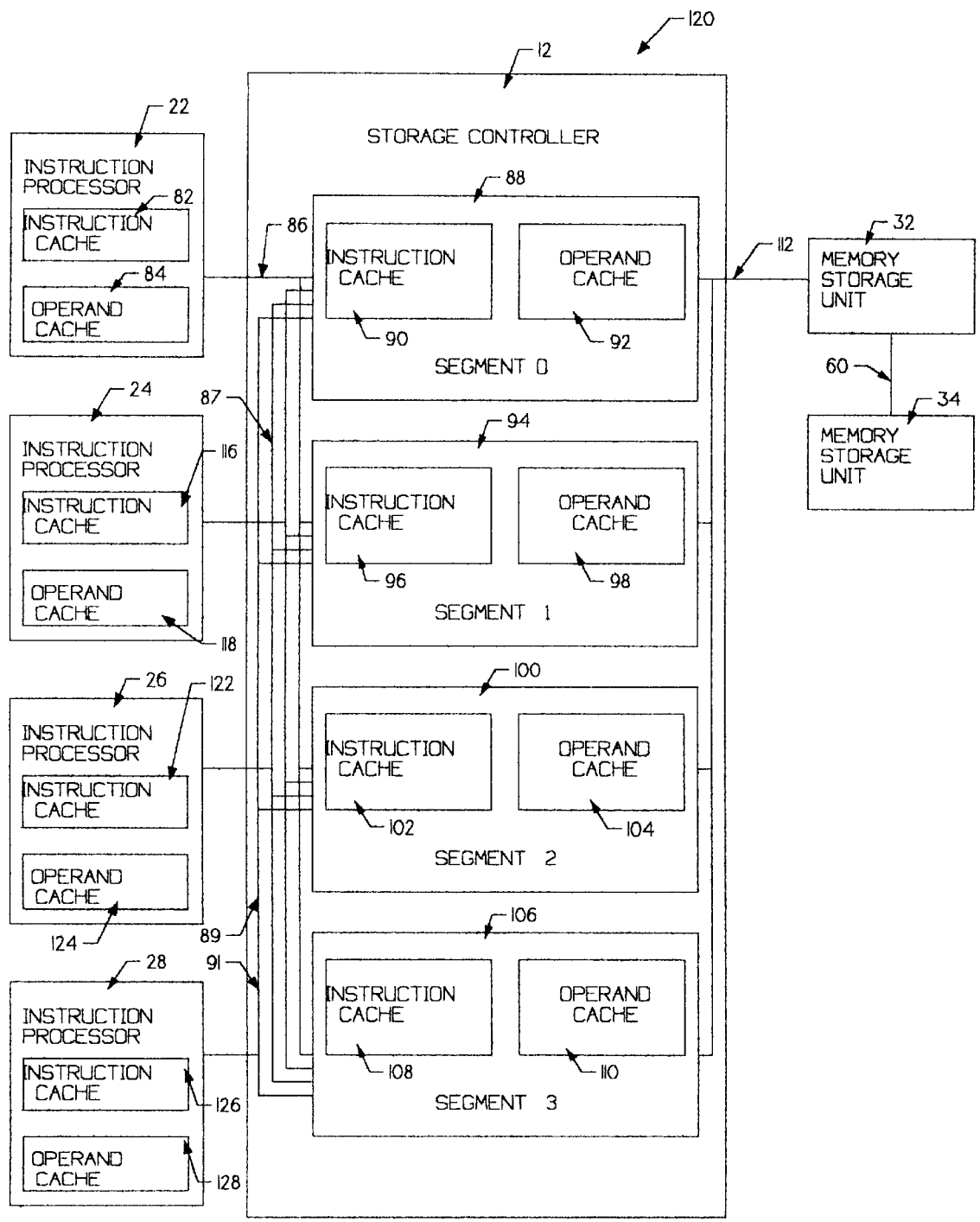
FIG. 5 is a schematic diagram showing the maximum-level (MC) configuration.

The two configurations typically used are the entry-level (EC) configuration (see, also FIG. 4) and the maximum-level (MC) configuration (see also, FIG. 5). In addition there are four address interleave choices available. These are the EC configuration with and without address interleave, and the MC configuration with and without address interleave. Each data element request as discussed above is divided between instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, depending upon the requested address. Only if the requested data element is not validly present in the appropriate second level cache resource is an access request made to the third level of storage to memory storage units 32 or 34.

FIG. 4 is a diagram 114 showing the entry-level (EC) configuration of the three levels of storage within data processing system 10. Instruction processor 22 which contains instruction cache 82 and an operand cache 84, and instruction processor 24 which contains instruction cache 116 and operand cache 118, are within the first level of storage. Instruction cache 82 and operand cache 84, as well as instruction cache 116 and operand cache 118, each store 8k of 36-bit words. These are internal to instruction processor 22 and instruction processor 116 and are dedicated to the operations undertaken therein. Thus by partitioning the internal dedicated cache resources in this manner, there is a certain concurrence of cache accesses associated with normal instruction execution.

Upon the request of either instruction processor 22 or instruction processor 116 to access a particular data element as either an instruction or operand, the directory of instruction cache 82 or operand cache 84 in the case of instruction processor 22, or instruction cache 116 or operand cache 118 in the case of instruction processor 24 is queried to determine if the required data element is present within the associated cache resource. If the data element is present and valid, the access is completed at that level. If not, in the case of instruction processor 22, it will make an access to storage controller 12 via interface 86 for the block of eight 36-bit words containing the desired data element. In the case of instruction processor 24, interface 87 is used.

Storage controller 12 is within the second level of storage. The storage controller contains two segments in the EC mode which can support up to two instruction processors. Each segment contains a 128k 36-bit word instruction cache and a 32k 36-bit words operand cache. In the EC configuration, second level cache segment 0-88 has instruction cache 90 and operand cache 92, and second level cache segment 1-94 has instruction cache 96 and operand cache 98. These cache resources are shared by all users of the two memory storage units within the cluster to include both local and remote users. Any memory request to storage controller 12 is routed to the appropriate directory of instruction cache 90 or operand cache 92 in second level cache segment 0-88, or instruction cache 96 or operand cache 98 in second level cache segment 1-94 to determine if the desired data element is present and valid. Each of the instruction and operand cache memories within second level cache segment 0-88 or second level cache segment 1-94 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either of instruction cache 90 or operand cache 92 in second level cache segment 0-88, or instruction cache 96 or operand cache 98 in second level cache segment 1-94, (depending upon the requested address), the data will then be requested from the third level of storage. Storage controller 12 is coupled to memory storage units 32 and 34 in the third level of storage via interface 112. In the preferred mode, memory storage units 32 and 34 each contain up to 128 meg. words of storage.

FIG. 5 is a diagram 120 showing the maximum-level (MC) configuration of the three levels of storage within data processing system 10. instruction processor 22 which contains instruction cache 82 and an operand cache 84, instruction processor 24 which contains instruction cache 116 and operand cache 118, instruction processor 26 which contains instruction cache 122 and operand cache 124, and instruction processor 28 which contains instruction cache 126 and operand cache 128, are each within the first level of storage. Each instruction cache 82, 116, 122 and 126, as well as each operand cache 84, 118, 124 and 128, can store 8k of 36-bit words. Each instruction or operand cache within a particular instruction processor are internal to that instruction processor (e.g. instruction processor 22, 24, 26 or 28) and are dedicated to the operations undertaken therein. Thus by partitioning the internal dedicated cache resources in this manner, there is a certain concurrence of cache accesses associated with normal instruction execution.

Upon the request of either instruction processor 22, instruction processor 24, instruction processor 26 or instruction processor 28 to access a particular data element as either an instruction or operand, the directory of instruction cache 82 or operand cache 84 in the case of instruction processor 22, instruction cache 116 or operand cache 118 in the case of instruction processor 22, instruction cache 122 or operand cache 124 in the case of instruction processor 26, or instruction cache 126 or operand cache 128 in the case of instruction processor 28, are queried to determine if the required data element is present within the associated cache resource. If not, in the case of instruction processor 22, it will make an access to storage controller 12 via interface 86 for the block of eight 36-bit words containing the desired data element. In the case of instruction processor 24, interface 87 is used; for instruction processor 26, interface 89 is used; and for instruction processor 28, interface 91 is used.

Storage controller 12 is within the second level of storage. The storage controller contains four segments in the MC mode which can support up to four instruction processors. Each segment contains a 128k 36-bit word instruction cache and a 32k 36-bit words operand cache. In the MC configuration, second level cache segment 0-88 has instruction cache 90 and operand cache 92, second level cache segment 1-94 has instruction cache 96 and operand cache 98, second level cache segment 2-100 has instruction cache 102 and operand cache 104, and second level cache segment 3-106 has instruction cache 108 and operand cache 110. These cache resources are shared by all users of the two memory storage units within the cluster to include both local and remote users. Any memory request to storage controller 12 is routed to the appropriate directory of instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, to determine if the desired data element is present and valid. Each of the instruction and operand cache memories within second level cache segment 0-88, second level cache segment 1-94, second level cache segment 2-100 or second level cache segment 3-106 are partitioned in address space to correspond to a particular address space within memory storage unit 32 or memory storage unit 34. As this routing is based upon the address requested, a particular second level instruction or operand cache resource within a particular segment will be accessed to determine if a requested data element is present before requesting the data element from memory storage unit 32 or memory storage unit 34 within the third level of storage.

If present and valid, the requested data element is supplied as an eight word block. If the requested data element is not validly present in either instruction cache 90 or operand cache 92 in second level cache segment 0-88, instruction cache 96 or operand cache 98 in second level cache segment 1-94, instruction cache 102 or operand cache 104 in second level cache segment 2-100, or instruction cache 108 or operand cache 110 in second level cache segment 3-106, (depending upon the requested address), the data will then be requested from the third level of storage. Storage controller 12 is coupled to memory storage units 32 and 34 in the third level of storage via interface 112. In the preferred mode, memory storage units 32 and 34 each contain 256 meg. words of storage. In the MC mode, the total address space partitioned within memory storage units 32 and 34 to correspond to the instruction and operand cache memories within second level cache segment 0-88, second level cache segment 1-94, second level cache segment 2-100 or second level cache segment 3-106 is the same as the total address space partitioned to correspond to the instruction and operand cache memories within the two segments of the entry-level (EC) configuration.

Figure 6:
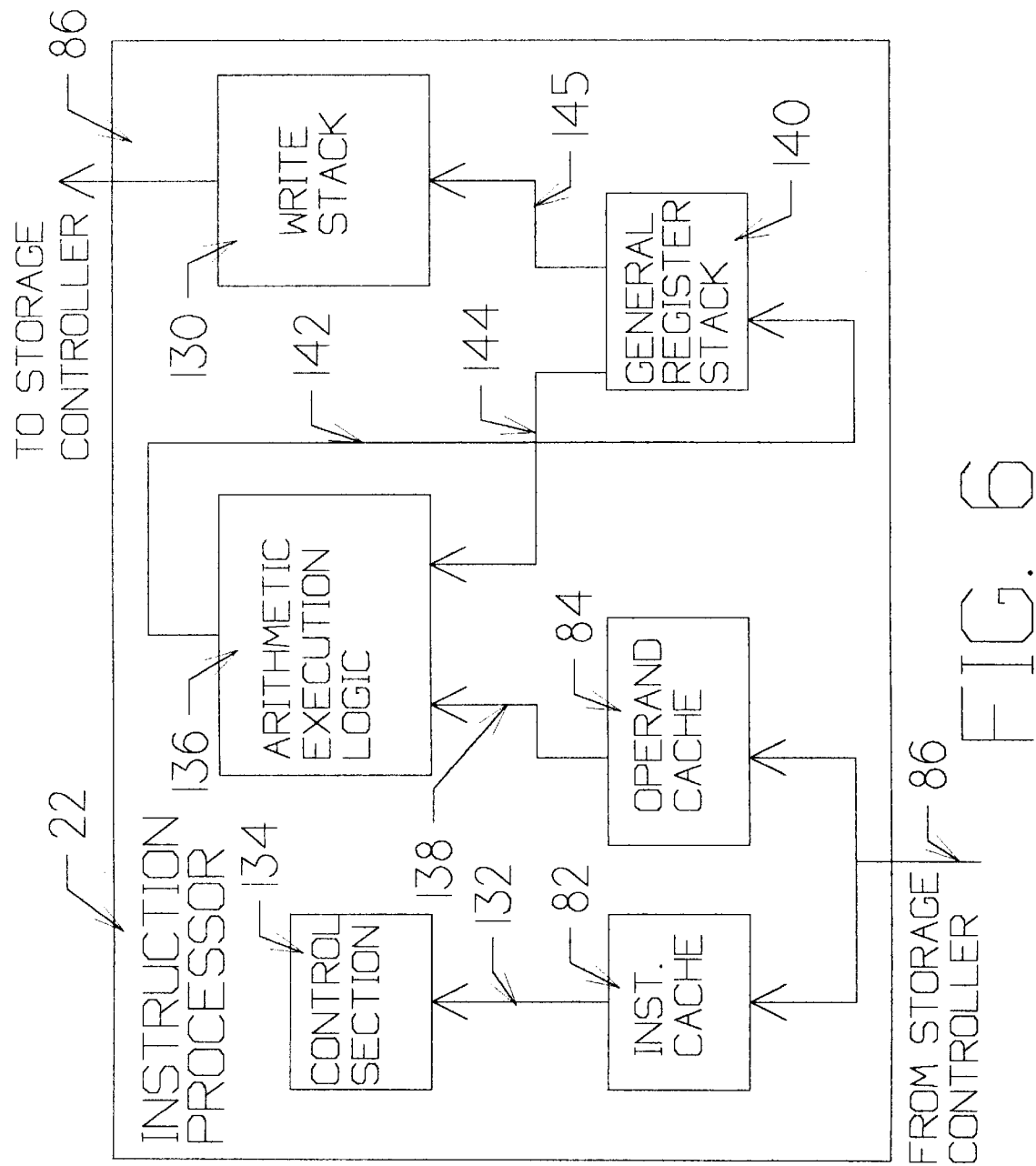
FIG. 6 is a simplified block diagram showing the major elements of the instruction processor.

FIG. 6 is a simplified block diagram of instruction processor 22 showing the major data and control paths. Interface 86, providing the data transfer path between storage controller 12 and instruction processor 22, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 22. Interface 86 also couples write data from write stack 130 to storage controller 12 for longer term storage. Priority for this shared interface is ordinarily given to read data requests requiring write data to be queued in write stack 130. The exception to giving priority to read data is whenever data is to be read from a location for which a write access has been queued.

Instructions from instruction cache 82 are provided via path 132 to control section 134 for decoding via microcode controller and hardwired control logic. Arithmetic execution logic 136 receives operand data via path 138 and performs the specified operation using a combination of microcode control and hardwired control as explained in greater detail below.

Most arithmetic instructions operate upon data which is temporarily stored in general register stack 140. This permits most rapid access to the data, because that data is directly accessed from an extremely fast storage stack. Similarly, arithmetic results are often returned to general register stack 140 for temporary storage until further arithmetic processing. Data is routed to general register stack 140 by path 142. Data from general register stack 140 is routed back to arithmetic execution logic 136 via path 144 and to write stack 130 via path 142. The data transferred to write stack 130 is queued for storage by storage controller 12 as discussed above.

Figure 7:
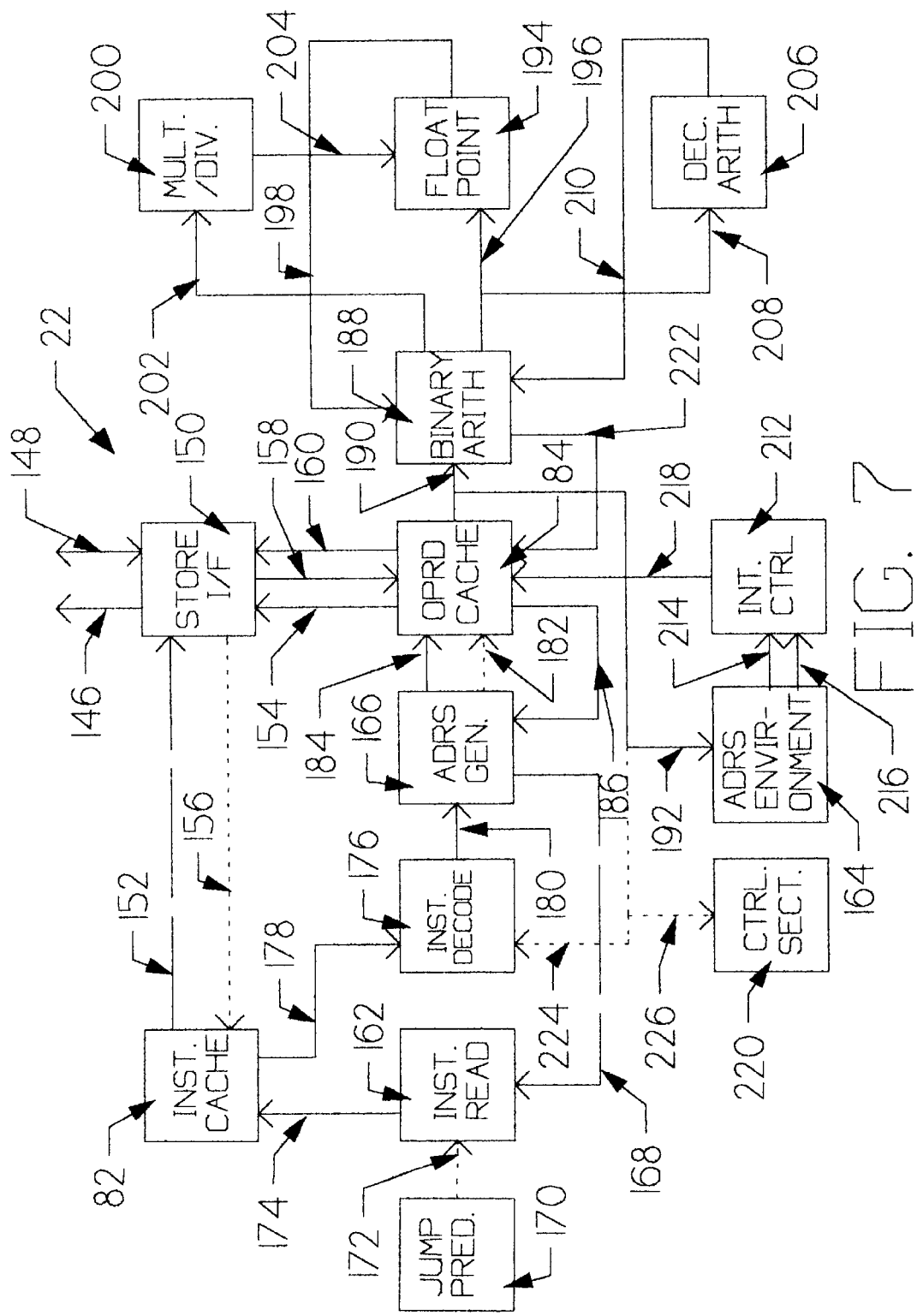
FIG. 7 is a detailed block diagram of the instruction processor.

FIG. 7 is a more detailed block diagram of instruction processor 22. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via interface 86, as described above. It consists of write interface 146 and read/write interface 148. Each of these data paths couples a 72-bit double word in parallel fashion. The function of write stack 130 (see also FIG. 4) is incorporated within store interface 150 which also provides the request/acknowledge synchronization logic. Addressing information for store interface 150 is sent from instruction cache 82 via interface 152 and operand cache 84 via interface 154 for a corresponding cache miss. Instructions are sent to instruction cache 82 via path 156. Because instructions are 36-bit words, path 156 has a width of 36 bits. Operand data read by storage controller 12 is transferred from store interface 150 to operand cache 84 by path 158. Similarly, write operand data is sent from operand cache 84 to store interface 150 via path 160. Both path 158 and path 160 have a width of 72 bits to accommodate double word operands.

Instructions to be executed are addressed by instruction read 162. The addresses are computed using one of the base registers located within address environment 164. If the instruction is the next sequential instruction, its address is determined by incrementing the program address counter. If the instruction to be executed is addressed by a branch or jump instruction, the address may be computed by address generator 166 and supplied via path 168. Alternatively, the address may be supplied by jump prediction 170 via path 172 during operation in the jump prediction mode as explained in detail below. The address of the next instruction is provided to instruction cache 82 via path 174.

The next addressed instruction is fetched from instruction cache 82 if a match is found. If the request results in a cache miss, storage controller 12 is requested to read the memory block containing the instruction as discussed above. In either case, the instruction is provided to instruction decoder 176 via path 178. The instruction is decoded through the use of a microcode controller by instruction decode 176, and the operand address is computed by address generator 166 from the data received via path 180.

Operand cache 84 contains general register stack 140 (see also, FIG. 4). The cache is addressed by the output of address generator 166 received from path 182. Direct operands are received on path 184. If a match is not made in operand cache 84, a read request is made of storage controller 12 through store interface 150 as explained above. If a match is found in operand cache 84 or if the instruction specifies a direct operand received on path 184, the operand data is more immediately produced. In either case, the operand data is routed in accordance with the operation to be performed as specified by the instruction. Indirect operands cause the new operand address to be transferred to address generator 166 via path 186. Operands are transferred to binary arithmetic 188 for mathematical computation via path 190 or to address environment 164 via path 192.

Binary arithmetic 188 provides the basic control for all arithmetic operations to be performed on data received via path 190. Floating point operations are scaled and controlled by floating point logic 194 which receives operand data on path 196. Floating point results are returned to binary arithmetic 188 by path 198. Mult./div. 200 performs the basic multiplication and division operations for fixed point instructions. Operand data is received via path 202 and the products/quotients returned via path 204 and floating point logic 194. Decimal arithmetic 206 receives operand data on path 208 and returns results via path 210. Decimal arithmetic performs special purpose decimal operations.

Another category of instructions involves a change to the base registers within the addressing environment 164. The data is supplied to addressing environment 164 via path 192. Base register contents are supplied to interrupt control 212 via paths 214 and 216. interrupt control 212 provides the interrupt data to operand cache 84 via path 218. Control section 220 provides the overall microcode control.

The operation of instruction processor 22 is intended to occur in the pipelined mode whenever feasible. The preferred mode utilizes a three stage pipeline. The operation of this pipeline may be found in U.S. patent application Ser. No. 07/762,276, entitled "Data Coherency Protocol for Multi-Level Cached High Performance Multiprocessor System", referenced co-pending application which has been incorporated herein by reference. The remaining referenced components are as previously discussed.

Figure 8:
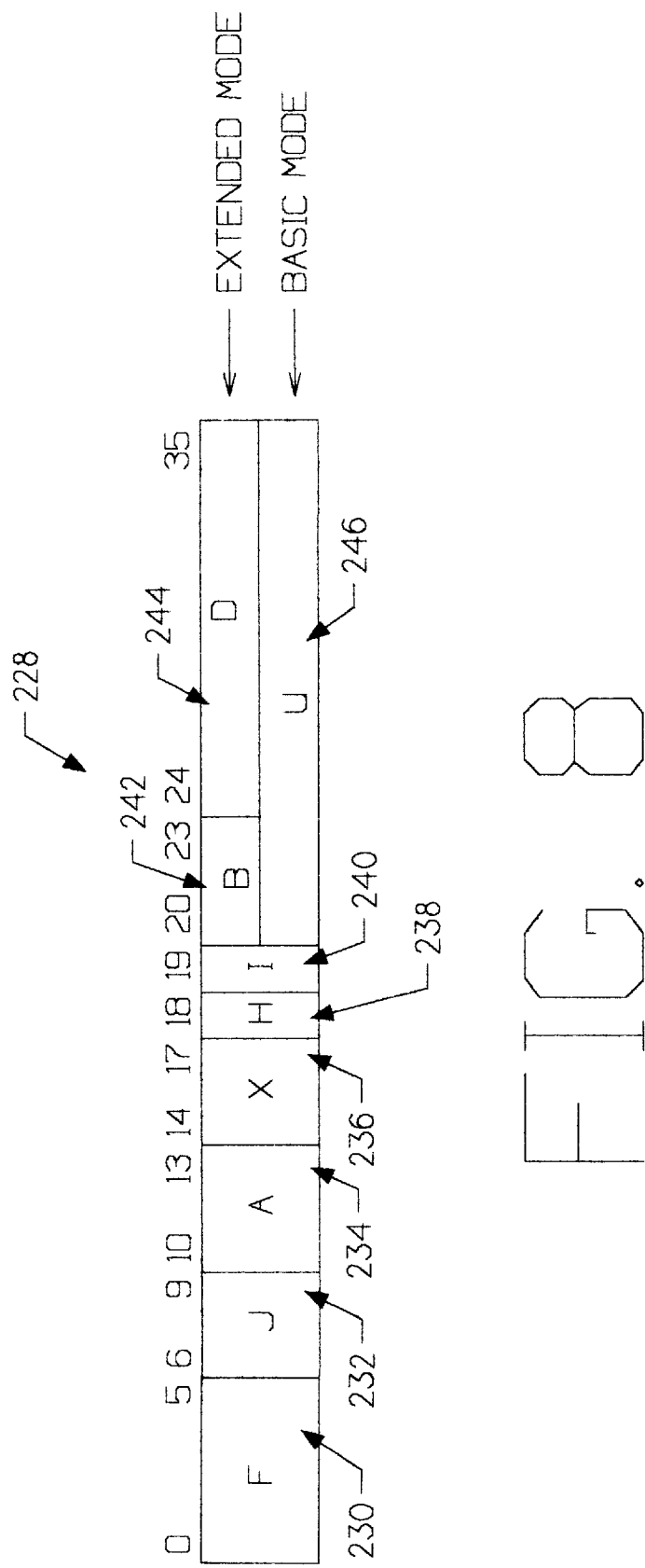
FIG. 8 shows the fields of a typical 36-bit machine instruction in both extended mode and basic mode format.

FIG. 8 shows the field format of a typical 36-bit machine instruction in both extended mode and basic mode format. The diagram is generally shown at 228. The F-field 230 or Function Code, including bits 0 through 5, specifies the operation to be performed by the instruction. The J-field 232, including bits 6 through 9, is sometimes combined with the F-field 230 to act as part of the Function Code, but usually represents an instruction operand qualifier indicating whether the instruction operand is the entire 36-bit word specified by the instruction operand address, a subfield of that word or the instruction operand address itself (immediate operand). The A-field 234, located at bits 10 through 13, is usually the register operand address specifying the address of the register containing the operand. However, for some instructions the A-field 234 acts as part of the Function Code 230. The X-field 236, at bits 14 through 17, is the index register (X-register) address specifying an index register to be used in the indexing operation to form the instruction operand address. The H-bit 238 at bit 18 is used to control index incrementation when the K-field of the instruction is non zero. The I-bit 240 at bit 19 indicates indirect addressing in basic mode unless the instruction specifies an immediate operand.

Generally, the "basic mode" denotes a basic set of machine instructions and capabilities, and "extended mode" denotes a set of machine instructions that includes the basic mode instructions plus a set of additional instructions, thereby providing extended operational capability. in extended mode, the I-bit 240 is used either as an extension to the B-field 242 or to indicate whether 18-bit or 24-bit relative addressing will be used. The B-field 242 at bits 20 through 23 in extended mode format is the base register selector which specifies a base register describing the bank containing the instruction operand. The displacement address in extended mode is specified by the D-field 244 (bits 24 through 35) and in basic mode by the U-field 246 (bits 20 through 35). Those fields contain a displacement value that is used in conjunction with the modifier portion of the index register specified by the X-field 236 to form an instruction operand relative address. A further discussion of the instruction format and the operation thereof can be found in the above-referenced U.S. patent application Ser. No. 07/762,282, entitled "Cooperative Hardware and Microcode Control System for Pipelined Instruction Execution", now U.S. Pat. No. 5,577,259.

FIG. 9 shows an exemplary base register stack. The diagram is generally shown at 248. The base register stack comprises a number of addressable base registers 250, 252, and 254. In a preferred embodiment, base register stack 248 comprises 15 base registers as shown. During initialization of an applications program, a selected set of base registers are loaded with a number of fields including a base register address field.

The base register stack 248 is used to allocate memory to each application program running on the data processing system. This is accomplished by using a virtual addressing scheme, wherein each base register contains a base address which may be used to calculate an absolute address. A further discussion of absolute address generation may be found in the above-referenced U.S. patent application Ser. No. 07/762,282, filed Sep. 19, 1991, entitled "Cooperative Hardware and Microcode Control System for Pipelined Instruction Execution", now U.S. Pat. No. 5,577,259, which is incorporated herein by reference.

FIG. 10 shows the format for one entry 256 in one of the 15 user base registers. Each entry consists of four 36-bit words (i.e., words 258, 260, 262 and 264), wherein each word has lower quarter 266, second quarter 268, and upper half 270. Word 258 has a number of control bits 272 within lower quarter 266 and second quarter 268. Upper half 270 of word 258 contains access lock 274.

Lower limit 276 is located in lower quarter 266 of word 260. Upper limit 278 is located in upper half 270 of word 260. Upper limit 278 and lower limit 276 are used to set the security limits on user program access to the associated data segment.

The base address consists of portion 280 located in upper half 270 of word 262 and portion 282 located in the entire 36 bits of word 264. In this manner, an absolute storage space of 252 words of 36 bits each can be uniquely addressed by the absolute address.

Figure 11:
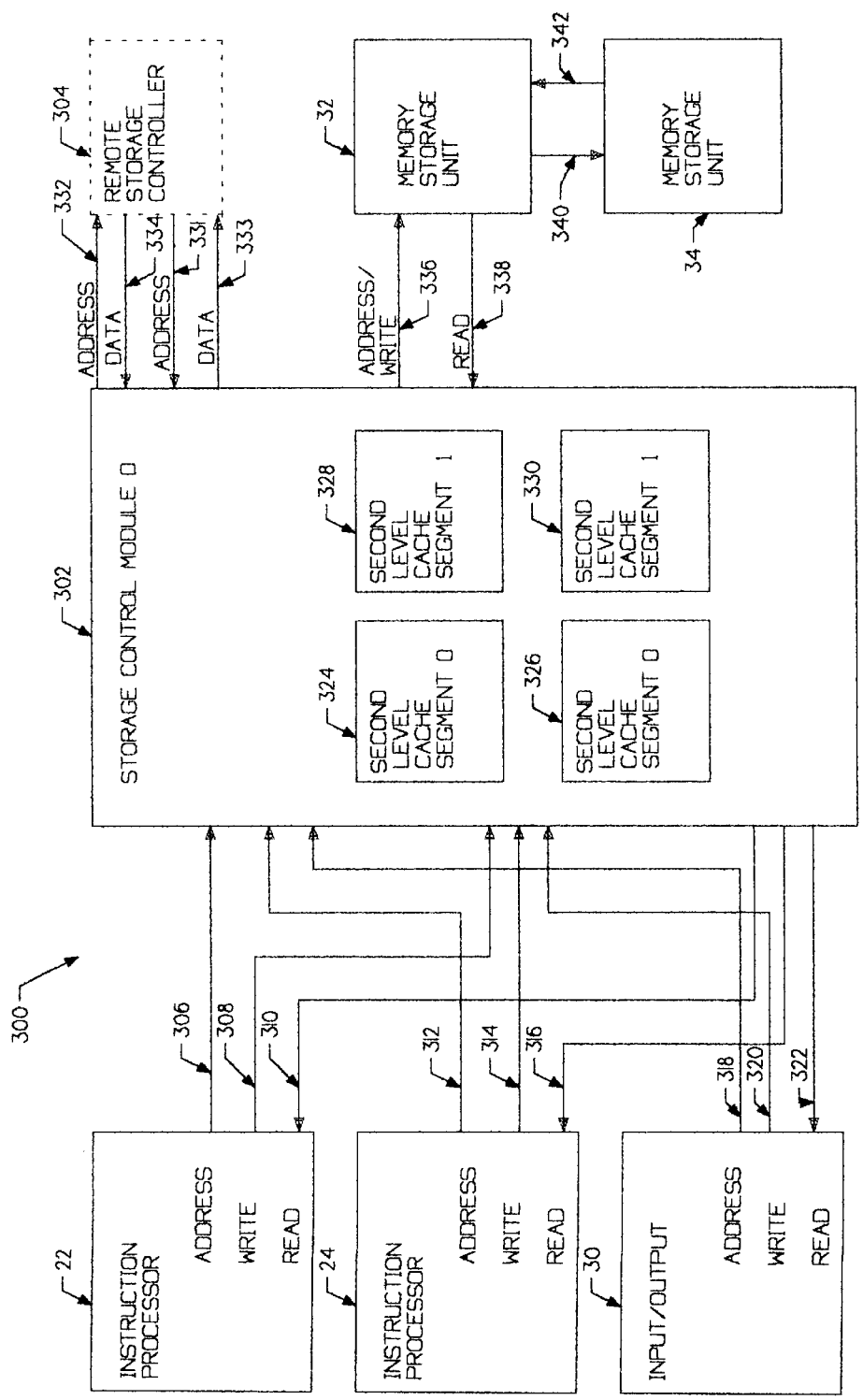
FIG. 11 is a block diagram showing the storage control module configuration for the entry-level (EC) configuration.

FIG. 11 is a block diagram showing the storage control module configuration for the entry-level (EC) configuration. The system block diagram shown at 300 is a 2× system, wherein the storage controller may expand as the size of the system expands to a 4× system, such as shown by the maximum level (MC) configuration (see also, FIG. 5). In the EC configuration, storage controller 12 has storage control module 0 302. Also included are instruction processor 22, instruction processor 24, input/output 30, memory storage unit 32, and memory storage unit 34. Storage control module 0 302 also couples to the remote storage controller shown at 304. Instruction processor 22 couples to storage control module 0 302 via address 306, write data path 308 and read data path 310. Instruction processor 24 couples to storage control module 0 302 via address 312, write data path 314 and read data path 316. Input/output 30 couples to storage control module 0 302 via address 318, write data path 320 and read data path 322. Storage control module 0 302 has second level cache segment 0 324, second level cache segment 0 326, second level cache 1 328 and second level cache segment 1 330. In this configuration, second level cache segment 0 88 as shown in FIG. 4 is split into two generic parts, second level cache segment 0 324 and second level cache segment 0 326, which operate together to form one functional second level cache segment 0 88. Similarly, second level cache segment 1 94 is split into second level cache segment 1 328 and second level cache segment 1 330. Storage control module 0 302 couples to remote storage controller 304 via paths 332, 334, 331, and 333. Path 332 is used by storage control module 0 302 to transmit address and control information to remote storage controller 304. Path 334 is used by storage control module 0 302 to receive previously requested read data or remote requester initiated write data from remote storage controller 304. Likewise, in the other direction, path 331 is used by storage control module 0 302 to receive address and control information from remote storage controller 304, and path 333 is used by storage control module 0 302 to transmit previously requested read data or requester initiated write data to remote storage controller 304. Storage control module 0 302 couples to memory storage unit 32 via address write path 336 and read path 338. Memory storage unit 32 couples to memory storage unit 34 via address write path 340 and read path 342. Second level cache segment 0 324 and second level cache segment 0 326 each cover one-half of the total address range. In addition, second level cache segment 1 328 and second level cache segment 1 330 each cover the other one-half of the address range. An address is provided to either second level cache segment 0 324 and second level cache segment 0 326, or to second level cache segment 1 328 and second level cache segment 1 330. The operation of the 2× system shown at 300 will be further described in reference to FIG. 13.

Figure 12:
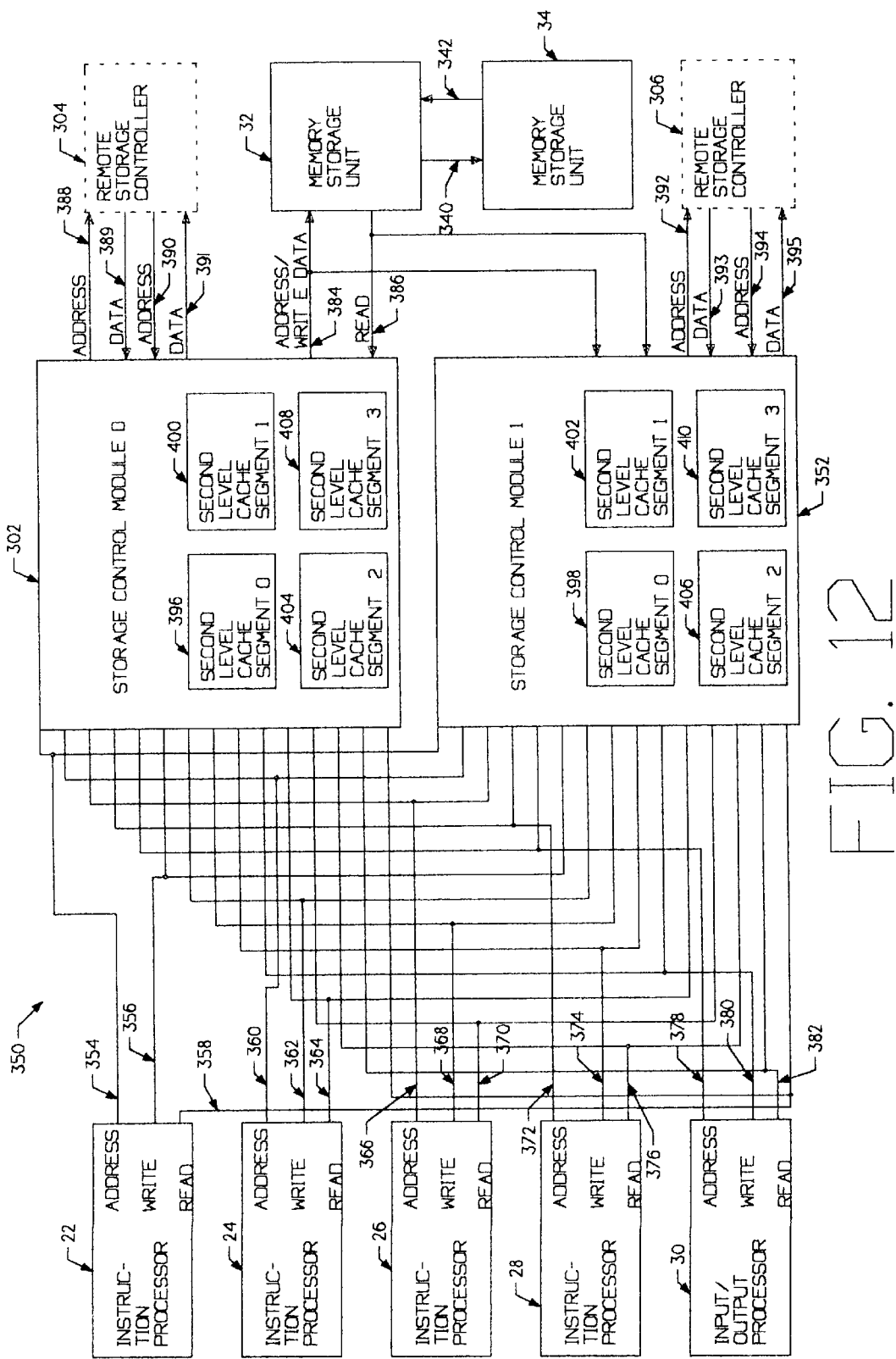
FIG. 12 is a block diagram showing the storage control module configuration for the maximum-level (MC) configuration.

FIG. 12 is a block diagram showing the storage control module configuration for the maximum level (MC) configuration. The MC configuration, also referred to as a 4× system, is shown generally at 350. This system is comprised of storage control module 0 302 and storage control module 1 352, and also has instruction processor 22, instruction processor 24, instruction processor 26, instruction processor 28, input/output 30, memory storage unit 32, and memory storage unit 34. Storage control module 0 302 may couple to a remote storage controller as shown at 304, and storage control module 1 352 may couple to a remote storage controller as shown at 306. Instruction processor 22 couples to storage control module 0 302 and storage control module 1 352 via address path 354, write data path 356 and read data path 358. Instruction processor 24 couples to storage control module 0 302 and storage control module 1 352 via address path 360, write data path 362 and read data path 364. Instruction processor 26 couples to storage control module 0 302 and storage control module 1 352 via address path 366, write data path 368, and read data path 370. Instruction processor 28 couples to storage control module 0 302 and storage control module 1 352 via address path 372, write data path 374 and read data path 376. Input/output 30 couples to storage control module 0 302 and storage control module 1 352 via address path 378, write data path 380 and read data path 382. Storage control module 0 302 and storage control module 1 352 both couple to memory storage unit 32 via address/write data path 384 and read data path 386. Memory storage unit 32 couples to memory storage unit 34 via address/write data path 340 and read data path 342. Storage control module 0 302 couples to remote storage controller 304 via paths 388, 389, 390, and 391. Path 388 is used by storage control module 0 302 to transmit address and control information associated with address ranges within segment 0 and segment 2 to remote storage controller 304. Path 389 is used by storage control module 0 302 to receive one-half of the previously requested read data or one-half of the remote requester initiated write data from remote storage controller 304, for all four segments 0–3. Likewise, in the other direction, path 390 is used by storage control module 0 302 to transmit one-half of the previously requested read data or one-half of local requester initiated write data to remote storage controller 304, for all four segments 0–3.

Storage control module 0 352 couples to remote storage controller 306 via paths 392, 393, 394, and 395. Path 392 is used by storage control module 0 352 to transmit address and control information associated with address ranges within segment 1 and segment 3 to remote storage controller 306. Path 393 is used by storage control module 0 352 to receive the other half of the previously requested read data or the other half of the remote requester initiated write data from remote storage controller 306, for all four segments 0–3. Likewise, in the other direction, path 394 is used by storage control module 0 352 to receive address and control information associated with address ranges within segment 1 and segment 3 from remote storage controller 306, and path 395 is used by storage control module 0 352 to transmit the other half of previously requested read data or the other half of local requester initiated write data to remote storage controller 306 for all four segments 0–3. In this configuration, shown generally at 350, storage control module 0 302 and storage control module 1 352 act together as a single storage controller with four independent second level cache segments and two times the second level cache memory capacity of the 2× system shown in FIG. 11. In the configuration shown generally at 350, each second level cache segment can be accessed simultaneously, thus maintaining the one-to-one ratio of second level cache "server" to instruction processor. Each second level cache segment covers one-fourth of the address range. Thus, second level cache segment 0 396 within storage control module 0 302 and second level cache segment 0 398 within storage control module 1 352 each cover one-fourth of the address range. Likewise, second level cache segment 1 400 and second level cache segment 1 402 each cover one-fourth of the address range, second level cache segment 2 404 and second level cache segment 2 406 each cover one-fourth of the address range, and second level cache segment 3 408 and second level cache segment 3 410 each cover one-fourth of the address range. In addition, storage control module 0 302 and storage control module 1 352 each control one-half of the write data and read data interface to instruction processor 22, instruction processor 24, instruction processor 26, instruction processor 28, input/output 30 or memory storage unit 32 and memory storage unit 34. The operation of the 4× system shown generally at 350 is further discussed in reference to FIG. 14A and 14B.

Figure 13:
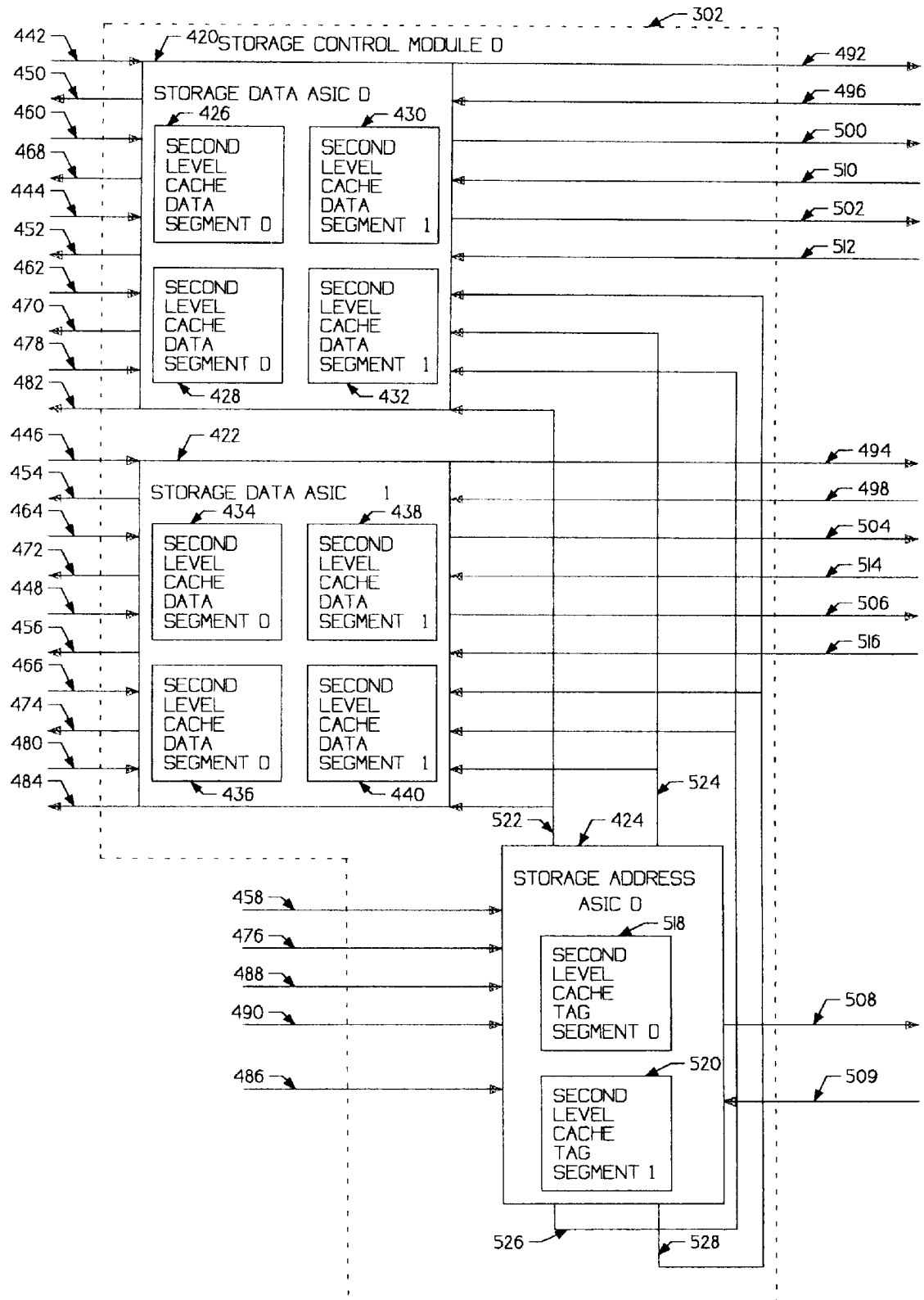
FIG. 13 is a block diagram showing the storage control module interconnect for the entry-level (EC) configuration.

FIG. 13 is a block diagram showing the storage control module interconnect for the entry-level (EC) configuration. The storage module interconnect shown is for a 2× system, and shows storage control module 0 302 as configured in FIG. 11. Storage control module 0 302 is comprised of three logic blocks, which may be implemented on application specific integrated circuits (ASICs). Storage data ASIC 0 420 and storage data ASIC 1 422 both have the same physical design, and both control the data logic and the data portion of the second level cache. Storage address ASIC 0 424 contains the second level cache tag memory and control logic. Storage data ASIC 0 420 contains second level cache data segment 0 426, second level cache data segment 0 428, second level cache data segment 1 430, and second level cache data segment 1 432. Storage data ASIC 1 422 contains second level cache data segment 0 434, second level cache data segment 0 436, second level cache data segment 1 438, and second level cache data segment 1 440. Second level cache data segment 0 426 and second level cache data segment 0 428 correspond to second level cache segment 0 324. Second level cache data segment 0 434 and second level data segment 0 436 correspond to second level cache segment 0 326. Second level cache data segment 1 430 and second level cache data segment 1 432 correspond to second level cache segment 1 328. Second level cache data segment 1 438 and second level cache data segment 1 440 correspond to second level cache segment 1 330. Second level cache segment 0 324, second level cache segment 0 326, second level cache segment 1 328, and second level cache segment 1 330 have been previously described (see also, FIG. 11). Storage data ASIC 0 420 and storage data ASIC 1 422 each comprise four quarter word write and read interfaces for instruction processor 22 or instruction processor 24, one-quarter word write and read interface for input/output 30, and two quarter word interfaces for remote read and write data to remote storage controller 304. Storage data ASIC 0 420 and storage data ASIC 1 422 also each comprise a one-quarter word combination write data and address interface to memory storage units 32 and 34, and a half word read data interface from memory storage units 32, and 34.

In the following discussion, instruction processor 22 corresponds to "IP 0" and instruction processor 24 corresponds to "IP 1". Input/output 30 corresponds to "I/O". "MSU" corresponds to memory storage unit 32 and memory storage unit 34, and "REM 0" corresponds to remote storage controller 304. Write data path 308 corresponds to IP 0 one-quarter word write data input paths 442, 444, 446 and 448. Input paths 442 and 444 couple to storage data ASIC 0 420. Input paths 446 and 448 couple to storage data ASIC 1 422. Read data path 310 corresponds to IP 0 one-quarter read data output paths 450, 452, 454 and 456. Paths 450 and 452 couple to storage data ASIC 0 420. Paths 454 and 456 couple to storage data ASIC 1 422. Address path 306 corresponds to IP 0 address/function input path 458. Path 458 couples to storage address ASIC 0 424. Write data path 314 corresponds to IP 1 one-quarter word write data input paths 460, 462, 464 and 466. Paths 460 and 462 couple to storage data ASIC 0 420. Paths 464 and 466 couple to storage data ASIC 1 422. Read data path 316 corresponds to IP 1 one-quarter word read data input paths 468, 470, 472 and 474. Paths 468 and 470 couple to storage data ASIC 0 420. Paths 472 and 474 couple to storage data ASIC 1 422. Address path 312 corresponds to IP 1 address/function input path 476. Path 476 couples to storage address ASIC 0 424. Address path 318 corresponds to I/O address/function input path 486. Path 486 couples to storage address ASIC 0 424. Write data path 320 corresponds to I/O one-quarter word write data input paths 478 and 480. Path 478 couples to storage data ASIC 0 420 and path 480 couples to storage data ASIC 1 422. Read data path 322 corresponds to I/O one-quarter word read data paths 482 and 484. Path 482 couples to storage data ASIC 0 420 and path 484 couples to storage data ASIC 1 422. IP 2 address function path 488 and IP 3 address function path 490, both of which couple to storage address ASIC 424, are not used in this configuration. Address/write data path 336 corresponds to MSU one-quarter word write data/ADR paths 492 and 494. Path 492 couples to storage data ASIC 420 and path 494 couples to storage data ASIC 422. Read data path 338 corresponds to MSU one-half word read data paths 496 and 498. Path 496 couples to storage data ASIC 420 and path 498 couples to storage data ASIC 422. Address path 332 corresponds to REM 0 address/function path 508. Path 508 couples from storage address ASIC 424. Data Path 334 corresponds to REM 0 one-quarter data paths 510, 512, 514, and 516. Path 510 and path 512 couple to storage data ASIC 420, and path 514 and path 516 couple to storage data ASIC 422. Address path 331 corresponds to REM 0 address/function path 509. Path 509 couples to storage address ASIC 424. Data Path 333 corresponds to REM 0 one-quarter data paths 500, 502, 504, and 506. Path 500 and path 502 couple from storage data ASIC 420, and path 504 and path 506 couple from storage data ASIC 422. Paths 492 and 494 are write data/address outputs. Paths 496, 510, 512, 498, 514 and 516 are data inputs. Paths 500, 502, 504 and 506 are data outputs. Path 508 is an address/function output. Path 509 is an address/function input. Address paths 306, 312 and 318, write data paths 308, 314, and 320, and read data paths 310, 316, 322, 334 and 338, and address write data paths 332 and 336 have been previously described (see also, FIG. 11). Storage address ASIC 0 424 further has second level cache tag segment 0 518 and second level cache tag segment 1 520. Storage data ASIC 0 424 is coupled to storage data ASIC 0 420 and storage data ASIC 1 422 via paths 522, 524, 526 and 528.

As the storage data ASIC 0 420, storage data ASIC 1 422 and storage address ASIC 424 may be configured in neither a 2× or 4× configuration (see also, FIG. 14A and 14B), a maintenance system must statically scan in the configuration information to storage address ASIC 0 424 to indicate that the 2× configuration as shown in FIG. 13 is desired. The configuration information may include an interleave mode and an identification number, and may define which particular one of a plurality of segments corresponds to a particular range of a plurality of address locations. Thus, when storage address ASIC 0 424 receives a request and address from a requester, such as instruction processor 22, instruction processor 24, input/output 30 or remote storage controller 304, the second level cache segment being requested will be determined. The second level cache tag segment 0 518 will be accessed if segment 0 is being requested, or second level cache tag segment 1 520 will be accessed if segment 1 is being requested. At the same time that either second level cache tag segment 0 518 or second level cache tag segment 1 520 are being accessed, storage address ASIC 0 424 outputs both address and control information to storage data ASIC 0 420 and storage data ASIC 1 422 via paths 522, 524, 526 and 528. Path 522 controls second level cache data segment 0 426 within storage data ASIC 0 420 and second level cache data segment 0 434 within storage data ASIC 1 422. Path 524 controls second level cache data segment 0 428 within storage data ASIC 0 420 and second level cache data segment 0 436 within storage data ASIC 1 422. Path 526 controls second level cache data segment 1 430 within storage data ASIC 0 420 and second level cache data segment 1 438 within storage data ASIC 1 422. Path 528 controls second level cache data segment 1 432 within storage data ASIC 0 420 and second level cache data segment 1 440 within storage data ASIC 1 422. Since paths 522 and 524 carry the same address and control information, second level cache data segment 0 blocks 426, 428, 434 and 436 will be accessed simultaneously and act in tandem as a single, second level cache segment. Alternatively, since paths 526 and 528 carry the same address and control information, second level cache data segment 1 blocks 430, 432, 438 and 440, will be accessed simultaneously and act in tandem as a single, second level cache segment. Paths 522 and 524, as well as paths 526 and 528, carry route code information to indicate to each second level cache data segment block which interface to use for write operations and which interface to use for read operations. Thus, if instruction processor 22 was to read information from second level cache data segment 0, then storage control ASIC 0 424 would send the addressing control information to storage data ASIC 0 420 and storage data ASIC 1 422 via paths 522 and 524. Second level cache data segment 0 426, 428, 434 and 436 would be accessed. The route information sent via path 522 would indicate to storage data ASIC 0 420 and storage data ASIC 1 422 to route its associated data segment block, second level cache data segment 0 426 and second level cache data segment 0 434 to half of the interface for instruction processor 22, which are read data interfaces 450 and 454. The route information sent via path 524 would indicate to storage data ASIC 0 420 and storage data ASIC 1 422 to route its associated data segment block, second level cache data segment 0 428 and second level cache data segment 0 436 to the other half of the interface to instruction processor 22, which are read data interfaces 452 and 456. As a result, a one word read data interface is provided by paths 450 and 454 via respectively second level cache data segment 0 426 and second level cache data segment 0 434, and by paths 452 and 456 via second level cache data segment 0 428 and second level cache data segment 0 436. Each of these one-quarter word read interfaces are combined to form the one word interface.

Figure 14A:
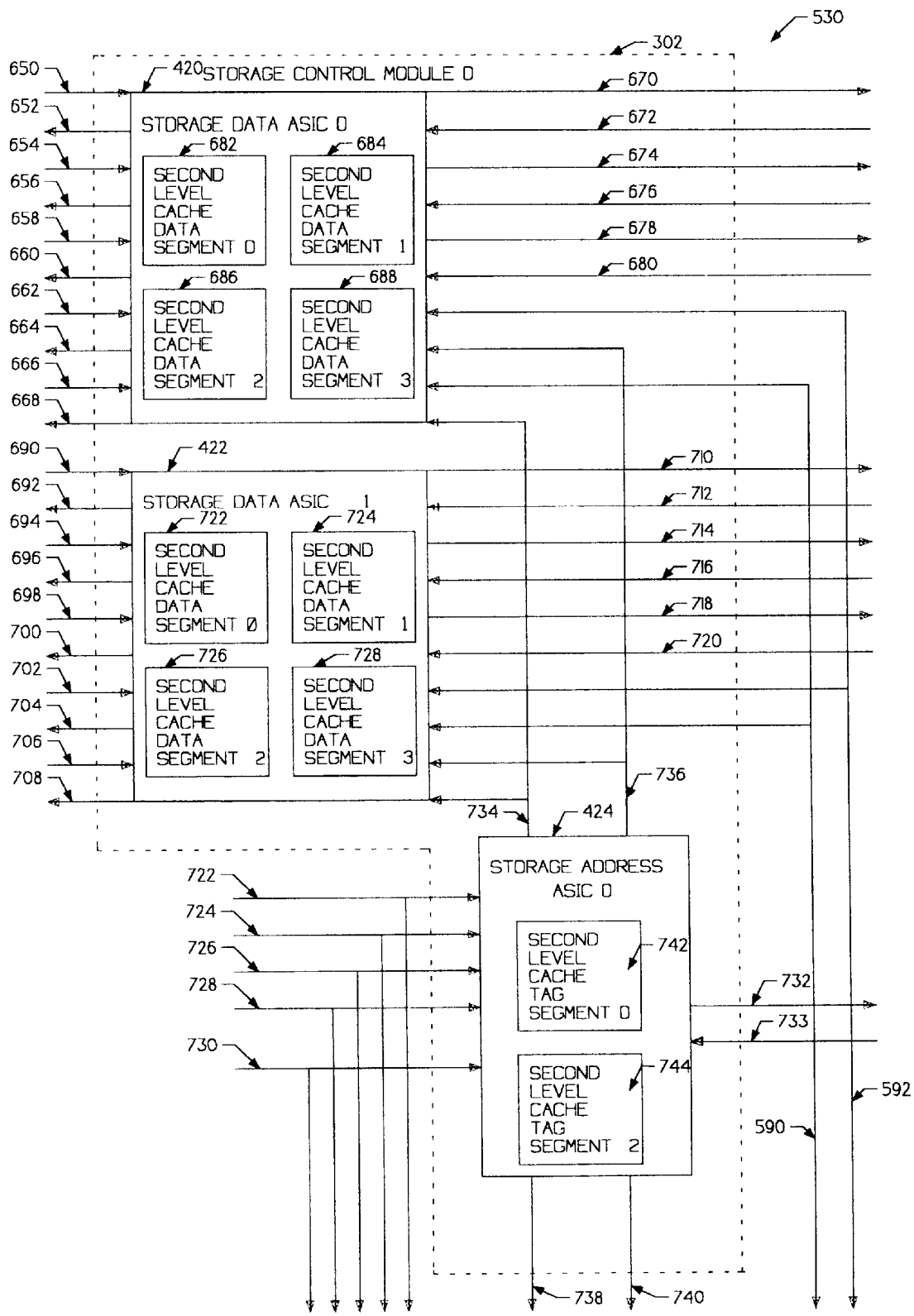
FIG. 14A and 14B is a block diagram showing the storage control module interconnect for the maximum-level (MC) configuration.
Figure 14B:
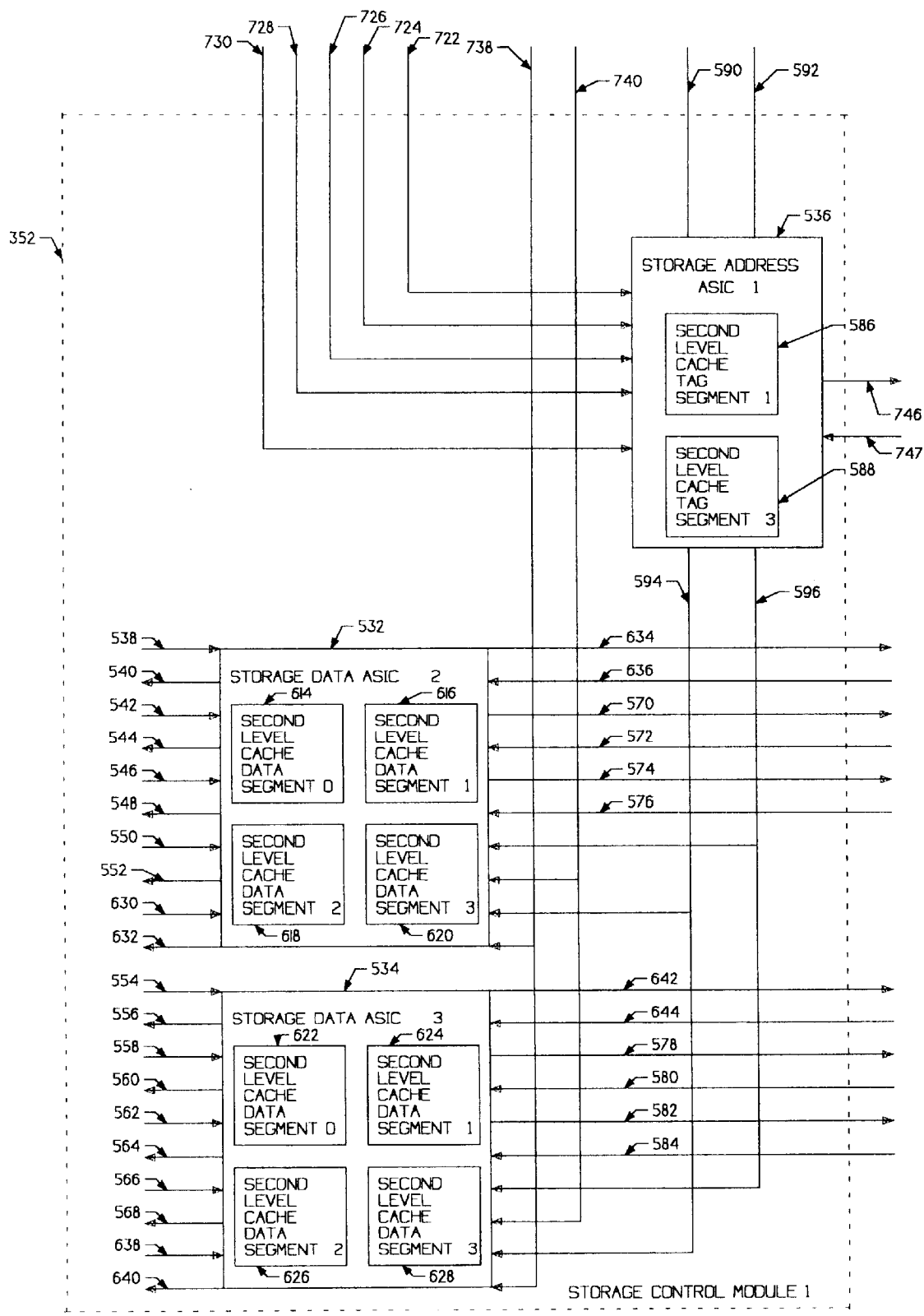

FIG. 14A and 14B is a block diagram showing the storage control module interconnect for the maximum-level (MC) configuration. The 4× interconnection corresponding with the MC configuration is shown generally at 530 and consists of storage control module 0 302 and storage control module 1 352 (see also, FIG. 12). Storage control module 0 302 has storage data ASIC 0 420, storage data ASIC 1 422 and storage address ASIC 0 424 (see also, FIG. 13). Storage data ASIC 0 420 and storage data ASIC 1 422 have the same physical design as shown in FIG. 13, but have different pin assignments for the MC configuration. Storage control module 1 352 has storage data ASIC 2 532, storage data ASIC 3 534 and storage address ASIC 1 536. Storage data ASIC 2 532 and storage data ASIC 3 534 have the same physical design as storage data ASIC 0 420 and storage data ASIC 1 422. Storage address ASIC 0 424 and storage address ASIC 1 536 also have the same physical design. Storage data ASIC 0 420 has second level cache data segment 0 682, second level cache data segment 1 684, second level cache data segment 2 686, and second level cache data segment 3 688. Storage data ASIC 1 422 has second level cache data segment 0 722, second level cache data segment 1 724, second level cache data segment 2 726, and second level cache data segment 3 728. Storage data ASIC 2 532 has second level cache data segment 0 614, second level cache data segment 1 616, second level cache data segment 2 618, and second level cache data segment 3 620. Storage data ASIC 3 534 has second level cache data segment 0 622, second level cache data segment 1 624, second level cache data segment 2 626, and second level cache data segment 3 628. Storage address ASIC 0 424 further has second level cache tag segment 0 742 and second level cache tag segment 2 744. Storage address ASIC 1 536 further has second level cache tag segment 1 586 and second level cache tag segment 3 588.

In the preferred embodiment, second level cache data segment 0 682 and second level cache data segment 0 722 correspond to second level cache segment 0 396. Second level cache data segment 1 684 and second level cache data segment 1 724 correspond to second level cache segment 1 400. Second level cache data segment 2 688 and second level cache data segment 2 726 correspond to second level cache segment 2 404. Second level cache data segment 3 688 and second level cache data segment 3 728 correspond to second level cache segment 3 408. Second level cache data segment 0 614 and second level cache data segment 0 622 correspond to second level cache segment 0 398. Second level cache data segment 1 616 and second level cache data segment 1 624 correspond to second level cache segment 1 402. Second level cache data segment 2 618 and second level cache data segment 2 626 correspond to second level cache segment 2 406. Second level cache data segment 3 620 and second level cache data segment 3 628 correspond to second level cache segment 3 410. Second level cache segment 0 396, second level cache segment 1 400, second level cache segment 2 404, and second level cache segment 3 408, as well as second level cache segment 0 398, second level cache segment 1 402, second level cache segment 2 406, and second level cache segment 3 410 have been previously described (see also, FIG. 12). Storage data ASIC 0 420, storage data ASIC 1 422, storage data ASIC 2 532, and storage data ASIC 1 534 each comprise four quarter word write and read interfaces for instruction processor 22, instruction processor 24, instruction processor 26, or instruction processor 28, one-quarter word write and read interface for input/output 30, and two quarter word interfaces for each of remote read and write data to remote storage controllers 304 and 306. Storage data ASIC 0 420, storage data ASIC 1 422, storage data ASIC 2 532, and storage data ASIC 1 534 each also comprise a one-quarter word combination write data and address interface to memory storage units 32 and 34, and a half word read data interface from memory storage units 32 and 34.

In the following discussion, instruction processor 22 corresponds to "IP 0", instruction processor 24 corresponds to "IP 1", instruction processor 26 corresponds to "IP 2", instruction processor 28 corresponds to "IP 3", input/output processor 30 corresponds to "I/O", memory storage unit 32 and memory storage unit 34 correspond to "MSU", remote storage controller 304 corresponds to "REM 0", and remote storage controller 306 corresponds to "REM 1". Referring to FIG. 12, address path 354 corresponds to IP 0 address/function input path 722. Path 722 couples to storage address ASIC 0 424 and storage address ASIC 1 536. Write data path 356 corresponds to IP 0 one-quarter word write data input paths 650, 690, 538 and 554. Input paths 650, 690, 538 and 554 couple respectively to storage data ASIC 0 420, storage data ASIC 1 422, storage data ASIC 2 532, and storage data ASIC 3 534. Read data path 358 corresponds to IP 0 one-quarter read data output paths 652, 692, 540 and 556. Output paths 652, 692, 540 and 556 couple respectively from storage data ASIC 0 420, storage data ASIC 1 422, storage data ASIC 2 532, and storage data ASIC 3 534. Address path 360 corresponds to IP 1 address/function input path 724. Path 724 couples to storage address ASIC 0 424 and storage address ASIC 1 536. Write data path 362 corresponds to IP 1 one-quarter word write data input paths 654, 694, 542 and 558. Input paths 654, 694, 542 and 558 couple respectively to storage data ASIC 0 420, storage data ASIC 1 422, storage data ASIC 2 532, and storage data ASIC 3 534. Read data path 364 corresponds to IP 1 one-quarter read data output paths 656, 696, 544 and 560. Output paths 656, 696, 544 and 560 couple respectively from storage data ASIC 0 420, storage data ASIC 1 422, storage data ASIC 2 532, and storage data ASIC 3 534. Address path 366 corresponds to IP 2 address/function input path 726. Path 726 couples to storage address ASIC 0 424 and storage address ASIC 1 536. Write data path 368 corresponds to IP 2 one-quarter word write data input paths 658, 698, 546 and 562. Input paths 658, 698, 546 and 562 couple respectively to storage data ASIC 0 420, storage data ASIC 1 422, storage data ASIC 2 532, and storage data ASIC 3 534. Read data path 370 corresponds to IP 2 one-quarter read data output paths 660, 700, 548 and 564. Output paths 660, 700, 548 and 564 couple respectively from storage data ASIC 0 420, storage data ASIC 1 422, storage data ASIC 2 532, and storage data ASIC 3 534. Address path 372 corresponds to IP 3 address/function input path 728. Path 728 couples to storage address ASIC 0 424 and storage address ASIC 1 536. Write data path 374 corresponds to IP 3 one-quarter word write data input paths 662, 702, 550 and 566. Input paths 662, 702, 550 and 566 couple respectively to storage data ASIC 0 420, storage data ASIC 1 422, storage data ASIC,2 532, and storage data ASIC 3 534. Read data path 376 corresponds to IP 3 one-quarter read data output paths 664, 704, 552 and 568. Output paths 664, 704, 552 and 568 couple respectively from storage data ASIC 0 420, storage data ASIC 1 422, storage data ASIC 2 532, and storage data ASIC 3 534. Address/write data path 384 corresponds to MSU one-quarter word write data/address paths 670, 710, 634 and 642. Output paths 670, 710, 634 and 642 couple respectively from storage data ASIC 0 420, storage data ASIC 1 422, storage data ASIC 2 532, and storage data ASIC 3 534. Read data path 386 corresponds to MSU one-half word read data paths 672, 712, 636 and 644. Input paths 672, 712, 636 and 644 couple respectively to storage data ASIC 0 420, storage data ASIC 1 422, storage data ASIC 2 532, and storage data ASIC 3 534.

Address path 388 corresponds to REM 0 address/function path 732. Path 732 couples from storage address ASIC 424. Data Path 389 corresponds to REM 0 one-quarter data paths 676, 680, 716, and 720. Path 676 and path 680 couple to storage data ASIC 420, and path 716 and path 720 couple to storage data ASIC 422. Address path 390 corresponds to REM 0 address/function path 733. Path 733 couples to storage address ASIC 424. Data Path 391 corresponds to REM 0 one-quarter data paths 674, 678, 714, and 718. Path 674 and path 678 couple from storage data ASIC 420, and path 714 and path 718 couple from storage data ASIC 422.

Address path 392 corresponds to REM 1 address/function path 746. Path 746 couples from storage address ASIC 536. Data Path 393 corresponds to REM 1 one-quarter data paths 572, 576, 580, and 584. Path 572 and path 576 couple to storage data ASIC 532, and path 580 and path 584 couple to storage data ASIC 534. Address path 394 corresponds to REM 1 address/function path 747. Path 747 couples to storage address ASIC 536. Data Path 395 corresponds to REM 1 one-quarter data paths 570, 574, 578, and 582. Path 570 and path 574 couple from storage data ASIC 532, and path 578 and path 582 couple from storage data ASIC 534.

A maintenance system statically scans in configuration information into storage data ASIC 0 420, storage data ASIC 1 422, storage data ASIC 2 532, storage data ASIC 3 534, storage address ASIC 0 424 and storage address ASIC 1 536. This configuration information designates that a 4× interconnect is going to be used. An identifying tag included in the configuration information allows storage data ASIC 0 420, storage data ASIC 1 422, storage data ASIC 2 532, storage data ASIC 3 534, storage address ASIC 0 424 and storage address ASIC 1 536 to determine which address range to respond to. Once storage address ASIC 0 424 and storage address ASIC 1 536 receive a request from instruction processors 22, 24, 26 or 28 or input/output processor 30, the segment being requested is determined so that the appropriate second level cache tag may be accessed. Storage address ASIC 0 424 has second level cache tag segment 0 742 and second level cache tag segment 2 744. Storage address ASIC 1 536 has second level cache tag segment 1 586 and second level cache tag segment 3 588. Storage address ASIC 0 424 (in the case of segment 0 or segment 2 being requested) or storage address ASIC 1 536 (in the case of segment 1 or segment 3 being requested) will drive the exact same information on both sets of control lines to storage data ASIC 0 420, storage data ASIC 1 422, storage data ASIC 2 532, and storage data ASIC 3 534. These interfaces include paths 734, 736, 738 and 740 for storage address ASIC 0 424, and paths 590, 592, 594 and 596 for storage data ASIC 1 536. Paths 734, 736, 590 and 592 couple to both storage data ASIC 0 420 and storage data ASIC 1 422. Paths 738, 740, 594 and 596 couple to both storage data ASIC 2 532 and storage data ASIC 3 534. Both storage address ASIC 0 424 and storage address ASIC 1 536 receive a request and address via paths 722, 724, 726, 728 or 730 from, respectively, instruction processor 22, instruction processor 24, instruction processor 26, instruction processor 28 or input/output processor 30. Storage address ASIC 0 424 and storage address ASIC 1 536 determine which of segments 1 through 4 is being requested. The appropriate one of either storage address ASIC 0 424 (if segment 0 or segment 2 is requested) or storage address ASIC 1 536 (if segment 1 or segment 3 is requested) will access the second level cache tag based on the requested segment. Storage address ASIC 0 424 accesses second level tag segment 0 742 if segment 0 is being requested, or accesses second level tag segment 2 744 if segment 2 is being requested. Storage address ASIC 1 536 accesses second level cache tag segment 1 586 if segment 1 is being requested, or accesses second level cache tag segment 3 588 if segment 3 is being requested. These address function and control lines are then presented to storage data ASIC 0 420, storage data ASIC 1 422, storage data ASIC 2 532 and storage data ASIC 3 534 via the paths as discussed above from storage data ASIC 0 424 and storage data ASIC 1 536. Thus, for example, if the function is a read request from instruction processor 22 (IP 0), the request is presented via path 722 to storage address ASIC 0 424 and storage address ASIC 1 536. If the request is to an address within segment 0, second level cache tag segment 0 742 is accessed to determine if the data is available within the second level cache. The address is presented to storage data ASIC 0 420 and storage data ASIC 1 422 via the coupling of path 734 to storage data ASIC 2 532 and storage data ASIC 3 534 via the coupling of path 738. The address is presented to second level cache data segment 0 682 within storage data ASIC 0 420, second level cache data segment 0 722 within storage data ASIC 1 422, second level cache data segment 0 614 within storage data ASIC 2 532, and second level cache 0 622 within storage data ASIC 3 534. During a read, storage data ASIC 0 420, storage data ASIC 1 422, storage data ASIC 2 532 and storage data ASIC 3 534 may each provide one-quarter word for each clock cycle. Second level cache data segment 0 682 outputs a first quarter of word read data on output 652, second level cache data segment 0 722 outputs a second quarter word read data on output path 692, second level cache data segment 0 614 outputs a third quarter of word read data on output path 540, and second level cache data segment 0 622 outputs a fourth quarter of word read data on output path 556. A total of one word is output since storage data ASIC 0 420, storage data ASIC 1 422, storage data ASIC 2 532 and storage data ASIC 3 534 each output one-quarter of the word read data. Thus, in comparison to the 2× configuration shown in FIG. 13, the performance of the input/output has effectively scaled with the addition of storage data ASIC 2 532 and storage data ASIC 3 534 as four rather than two storage data ASICs now output the word read data. The performance of the input/output similarly scales when a write is performed. That is, the write data interfaces of storage data ASIC 0 420, storage data ASIC 1 422, storage data ASIC 2 532 and storage data ASIC 3 534 scale in comparison to the 2× configuration shown in FIG. 13.

Each storage data ASIC may output one-quarter word of write data or address to MSU, and may input one-half word of read data from MSU. Storage data ASIC 0 420 may output one-quarter word of write data or address to MSU via path 670, and may input one-half word of read data via path 672. Storage data ASIC 1 422 may output one-quarter word of write data or address to MSU via path 710, and may input one-half word of read data via path 712. Storage data ASIC 2 532 may output one-quarter word of write data or address to MSU via path 634, and may input one-half word of read data via path 636. Storage data ASIC 3 534 may output one-quarter word of write data or address to MSU via path 642, and may input one-half word of read data via path 644. Storage data ASIC 0 420 may output two one-quarter words of write data to REM 0 via paths 674 or 678 respectively, or may input two one-quarter words of read data from REM 0 via paths 676 or 680 respectively. Storage data ASIC 1 422 may output two one-quarter words of write data to REM 0 via paths 714 or 718 respectively, or may input two one-quarter words of read data from REM 0 via paths 716 or 720 respectively. Storage data ASIC 2 532 may output two one-quarter words of write data to REM 1 via paths 570 or 574 respectively, or may input two one-quarter words of read data from REM 1 via paths 572 or 576 respectively. Storage data ASIC 3 534 may output two one-quarter words of write data to REM 1 via paths 578 or 582 respectively, or may input two one-quarter words of read data from REM 1 via paths 580 or 584 respectively. Paths 674, 676, 714, 716, 570, 572, 578, and 580 are associated with data from segment 0 or segment 2. Paths 678, 680, 718, 720, 574, 576, 582, and 584 are associated with data from segment 1 or segment 3. Storage address ASIC 0 424 may output an address or function to REM 0 via path 732. Storage address ASIC 0 424 may input an address or function from REM 0 via path 733. Storage address ASIC 1 536 may output an address or function to REM 1 via path 746. Storage address ASIC 1 536 may input an address or function from REM 1 via path 747.

Figure 15A:
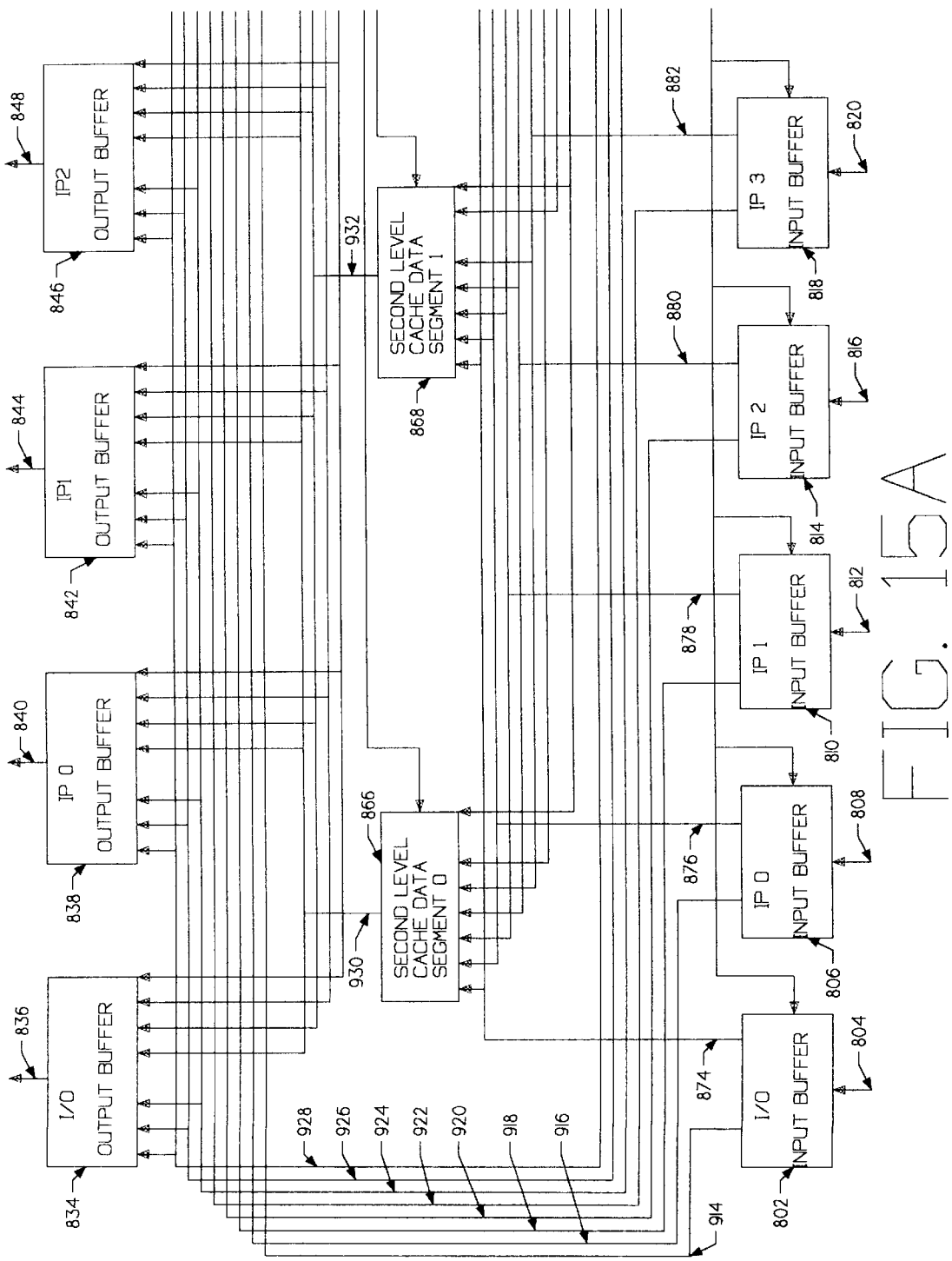
FIG. 15A and 15B is a block diagram showing the Storage Data Application Specific Integrated Circuit (ASIC)
Figure 15B:
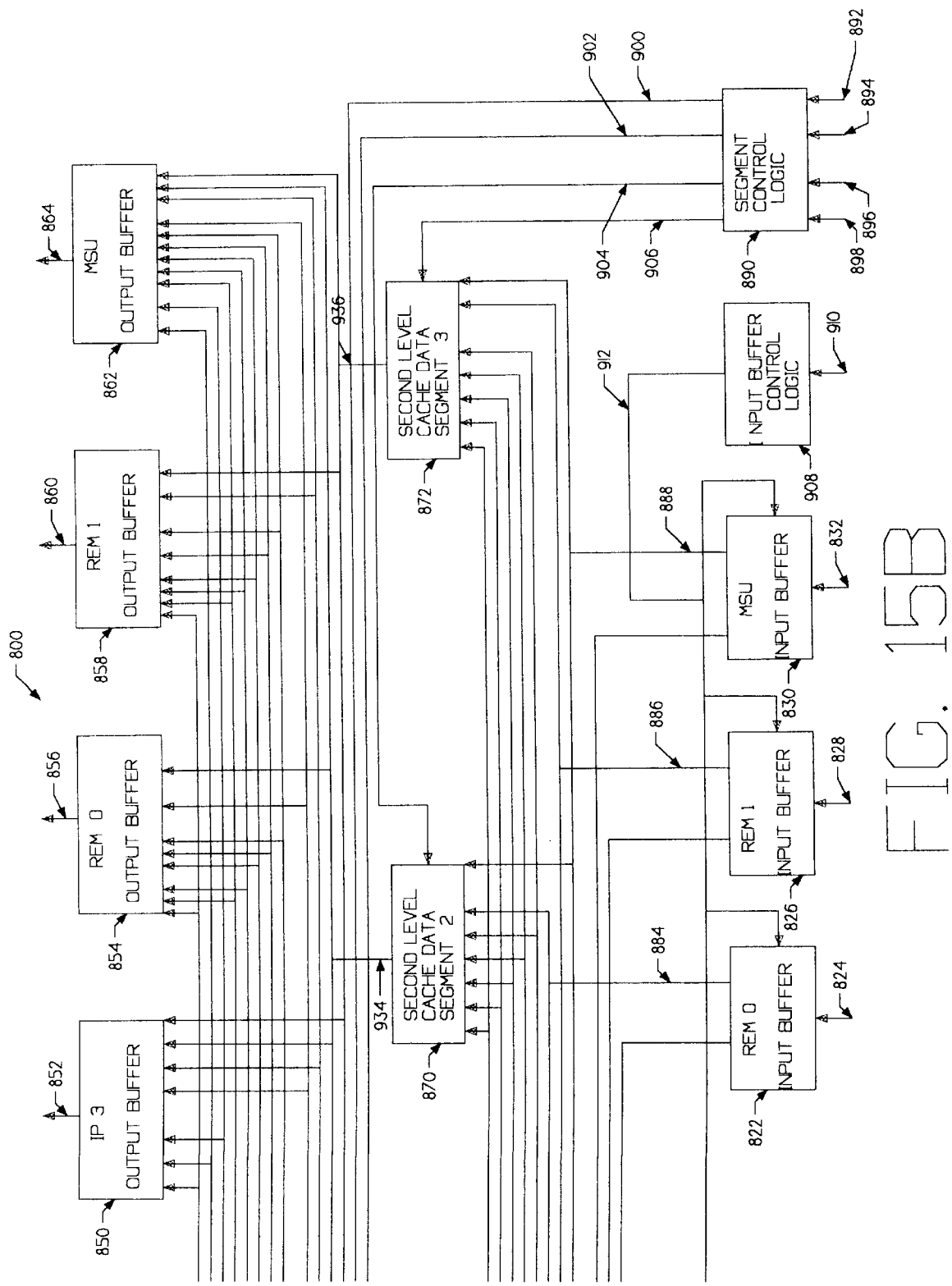

FIG. 15A and 15B is a block diagram showing the storage data application specific integrated circuit (ASIC). The storage data ASIC is shown generally at 800. I/O input buffer 802 couples to input/output 30 via a one-quarter word write data input at path 804. IP 0 input buffer 806 couples to instruction processor 22 via a one-quarter word write data input at path 808. IP 1 input buffer 810 couples to instruction processor 24 via a one-quarter word write data input at path 812. IP 2 input buffer 814 couples to instruction processor 26 via a one-quarter word write data input at path 816. IP 3 input buffer 818 couples to instruction processor 28 via a one-quarter word write data input at 820. REM 0 input buffer 822 couples to remote storage controller 304 and remote storage controller 306 for segment 0 and segment 2 data via a one-quarter word read data input at 824. REM 1 input buffer 826 couples to remote storage controller 304 and remote storage controller 306 for segment 1 and segment 3 data via a one-quarter word read data input at 828. MSU input buffer 830 couples to memory storage unit 32 via a one-half word read data input at 832. I/O output buffer 834 has a one-quarter word read data output at path 836. IP 0 output buffer 838 has a one-quarter word read data output at path 840. IP 1 output buffer 842 has a one-quarter word read data output at path 844. IP 2 output buffer 846 has a one-quarter word read data output at path 848. IP 3 output buffer 850 has a one-quarter word read data output at path 852. REM 0 output buffer 854 has a one-quarter word read data output at 856. REM 1 output buffer 858 has a one-quarter word read data output at 860. MSU output buffer 862 has a one-quarter word address write data output at 864. These input buffers and output buffers may contain eight 36-bit words (see also, FIG. 8). The input buffers are each coupled to four second level cache data segments. These are second level cache data segment 0 866, second level cache data segment 1 868, second level cache data segment 2 870, and second level cache data segment 3 872. Each input buffer has a single output which couples to all four second level cache data segments as follows: I/O input buffer 802 couples through path 874, IP 0 input buffer 806 couples through path 876, IP 1 input buffer 810 couples through path 878, IP 2 input buffer 814 couples through path 880, IP 3 input buffer 818 couples through path 882, REM 0 input buffer 822 couples through path 884, but only to segment 0 and segment 2, REM 1 input buffer 826 couples through path 886, but only to segment 1 and segment 3, and MSU input buffer 830 couples through path 888. Thus, second level cache data segment 0 866, second level cache data segment 1 868, second level cache data segment 2 870 and second level cache data segment 3 872 each have seven inputs corresponding to the outputs from the eight input buffers as shown in FIG. 15A and FIG. 15B. Second level cache data segment 0 866, second level cache data segment 1 868, second level cache data segment 2 870 and second level cache data segment 3 872 are logically independent and can operate in parallel or in tandem depending on the state of the individual control lines from segment control logic 890. Segment control logic 890 has a segment 0 control input at 892, a segment 1 control input at 894, a segment 2 control input at 896, and a segment 3 control input at 898. Segment control logic 890 couples to second level cache data segment 0 866 via path 900, to second level cache data segment 1 868 via path 902, to second level cache data segment 2 870 via path 904, and to second level cache data segment 3 872 via path 906. Input control paths 892, 894, 896 and 898 couple to the storage address ASICs (see also, FIG. 16). Segment control logic 890 determines whether second level cache segment 0 866, second level cache segment 1 868, second level cache segment 2 870, and second level cache segment 3 872 are going to operate in the 2× configuration (see also, FIG. 13) or in the 4× configuration (see also, FIG. 14A and 14B). Input buffer control logic 908 has an input control signal at path 910. Input buffer control logic 908 couples to I/O input buffer 802, IP 0 input buffer 806, IP 1 input buffer 810, IP 2 input buffer 814, IP 3 input buffer 818, REM 0 input buffer 822, REM 1 input buffer 826, and MSU input buffer 830 via path 912. Through path 912 then, input buffer control logic 908 may select and enable each input buffer to receive data.

I/O input buffer 802 couples to REM 0 output buffer 854, REM 1 output buffer 858, and MSU output buffer 862 via path 914. IP 0 input buffer 806 couples to REM 0 output buffer 854, REM 1 output buffer 858 and MSU output buffer 862 via path 916. IP 1 input buffer 810 couples to REM 0 output buffer 854, REM 1 output buffer 858 and MSU output buffer 862 via path 918. IP 2 input buffer 814 couples to REM 0 output buffer 854, REM 1 output buffer 858 and MSU output buffer 862 via path 920. IP 3 input buffer 818 couples to REM 0 output buffer 854, REM 1 output buffer 858 and MSU output buffer 862 via path 922. REM 0 input buffer 822 couples to I/O output buffer 834, IP 0 output buffer 838, IP 1 output buffer 842, IP 2 output buffer 846, IP 3 output buffer 850, and MSU output buffer 862 via path 924. REM 1 input buffer 826 couples I/O output buffer 834, IP O output buffer 838, IP 1 output buffer 842, IP 2 output buffer 846, IP 3 output buffer 850, and MSU output buffer 862 via path 926. MSU input buffer 830 couples to I/O output buffer 834, IP 0 output buffer 838, IP 1 output buffer 842, IP 2 output buffer 846, IP 3 output buffer 850, REM 0 output buffer 854, and REM 1 output buffer 858 via path 928. Second level cache data segment 0 866 couples to I/O output buffer 834, IP 0 output buffer 838, IP 1 output buffer 842, IP 2 output buffer 846, IP 3 output buffer 850, REM 0 output buffer 854, and MSU output buffer 862 via path 930. Second level cache data segment 1 868 couples to I/O output buffer 834, IP 0 output buffer 838, IP 1 output buffer 842, IP 2 output buffer 846, IP 3 output buffer 850, REM 1 output buffer 858, and MSU output buffer 862 via path 932. Second level cache data segment 2 870 couples to I/O output buffer 834, IP 0 output buffer 838, IP 1 output buffer 842, IP 2 output buffer 846, IP 3 output buffer 850, REM 0 output buffer 854, and MSU output buffer 862 via path 934. Second level cache data segment 3 872 couples to I/O output buffer 834, IP 0 output buffer 838, IP 1 output buffer 842, IP 2 output buffer 846, IP 3 output buffer 850, REM 1 output buffer 858, and MSU output buffer 862 via path 936.

When write data is presented by a particular requester, for example to IP 0 input buffer 806 via path 808, either storage address ASIC 0 424 or storage address ASIC 1 536, upon detecting the write request, will activate an input strobe to input buffer control logic 908 via path 910, which in turn enables clocking of IP 0 input buffer 806 via path 912. Storage address ASIC 0 424 or storage address ASIC 1 536 will activate one input to segment control logic 890 if the 4× configuration is selected or two inputs if the 2× configuration is selected. These inputs are the segment 0 control at 892, the segment 1 control at 894, the segment 2 control at 896, and the segment 3 control at 898. With the 4× configuration or 2× configuration, the one or two of these segment control lines selected correspond to a particular second level cache data segment. Thus, the segment 0 control at 892 being activated will select second level cache data segment 0 866 for the 4× configuration.

When the write operation is to be performed, storage address ASIC 0 424 or storage address ASIC 1 536 presents an address, function, hit information, and route code information to the segment 0 control line at 892, the segment 1 control line at 894, the segment 2 control line at 896 or the segment 3 control line at 898. Segment control logic 890 enables second level cache segment 0 866 via path 900, if segment 0 control line at 892 is enabled; second level cache segment 1 868 via path 902, if segment 1 control line at 894 is enabled; second level cache segment 2 870 via path 904, if segment 2 control line at 896 is enabled; or second level cache segment 3 672 via path 906, if segment 3 control line at 898 is enabled. The selected second level cache data segment clocks in the input buffer data specified by the route code and transfers the data into its cache storage thus completing the write operation. Each requestor is only allowed to send one write request until the request is acknowledged, which occurs when the data is read out of an input buffer (e.g., one of I/O input buffer 802, IP 0 input buffer 806, IP 1 input buffer 810, IP 2 input buffer 814, IP 3 input buffer 818, REM 0 input buffer 822, REM 1 input buffer 826, or MSU input buffer 830), and written into a second level cache data segment (e.g. one of second level cache data segment 0 866, second level cache data segment 1 868, second level cache data segment 2 870, or second level cache data segment 3 872). If there is more than one request that is addressed to a particular second level cache data segment at a single instant in time, the requests are queued up, and either storage address ASIC 0 424 or storage address ASIC 1 536 determines the priority between the requestors. The write data information will be held in either I/O input buffer 804, IP 0 input buffer 806, IP 1 input buffer 810, IP 2 input buffer 814, IP 3 input buffer 818, REM 0 input buffer 822, REM 1 input buffer 826, or MSU input buffer 830, until it has been selected by the storage address ASIC 0 424 or storage address ASIC 1 536. The eight input buffers (shown at 802, 806, 810, 814, 818, 822, 826, and 830) buffer the information at an incoming rate of one-quarter word per clock cycle and present the information to the second level cache data segments (shown at 866, 868, 870, and 872) at a rate of one word per clock cycle or four times the incoming rate.

For a read operation, storage address ASIC 0 424 or storage address ASIC 1 536 presents an address, function, hit information, and route code information to the segment 0 control line at 892, the segment 1 control line at 894, the segment 2 control line at 896 or the segment 3 control line at 898. Segment control logic 890 enables second level cache segment 0 866 via path 900 if segment 0 control line at 892 is enabled, second level cache segment 1 868 via path 902 if segment 1 control line at 894 is enabled, second level cache segment 2 870 via path 904 if segment 2 control line at 896 is enabled, or second level cache segment 3 872 via path 906 if segment 3 control line at 898 is enabled. The selected second level cache data segment passes the data to the output buffer specified by the route information (e.g. either I/O output buffer 834, IP 0 output buffer 838, IP 1 output buffer 842, IP 2 output buffer 846, IP 3 output buffer 850, REM 0 output buffer 854, REM 1 output buffer 858, or MSU output buffer 862). The second level cache data segments operate at a different throughput rate than the output buffers. Second level cache data segment 0 866, second level cache data segment 1 868, second level cache data segment 2 870, and second level cache data segment 3 872 clock one word per cycle, whereas I/O output buffer 834, IP 0 output buffer 838, IP 1 output buffer 842, IP 2 output buffer 846, IP 3 output buffer 850, REM 0 output buffer 854, REM 1 output buffer 858, and MSU output buffer 862 output only one-quarter word per clock cycle, or one-fourth the rate of the second level cache data segments.

The storage data ASIC shown at 800 further provides for multiple read or write operations which may occur at the same time. Reading and writing from a same requester may be performed as all interfaces are independent. Furthermore, since each of second level cache data segment 0 866, second level cache data segment 1 868, second level cache data segment 2 870, and second level cache data segment 3 872 may be one word in width, while each of I/O output buffer 834, IP 0 output buffer 838, IP 1 output buffer 842, TP 2 output buffer 846, IP 3 output buffer 850, REM 0 output buffer 854, REM I output buffer 858 and MSU output buffer 862 may be one-quarter word in width, the total second level cache data segment band pass may be equivalent to 16 write or read interfaces for the maximum-level (MC) configuration.

Figure 16:
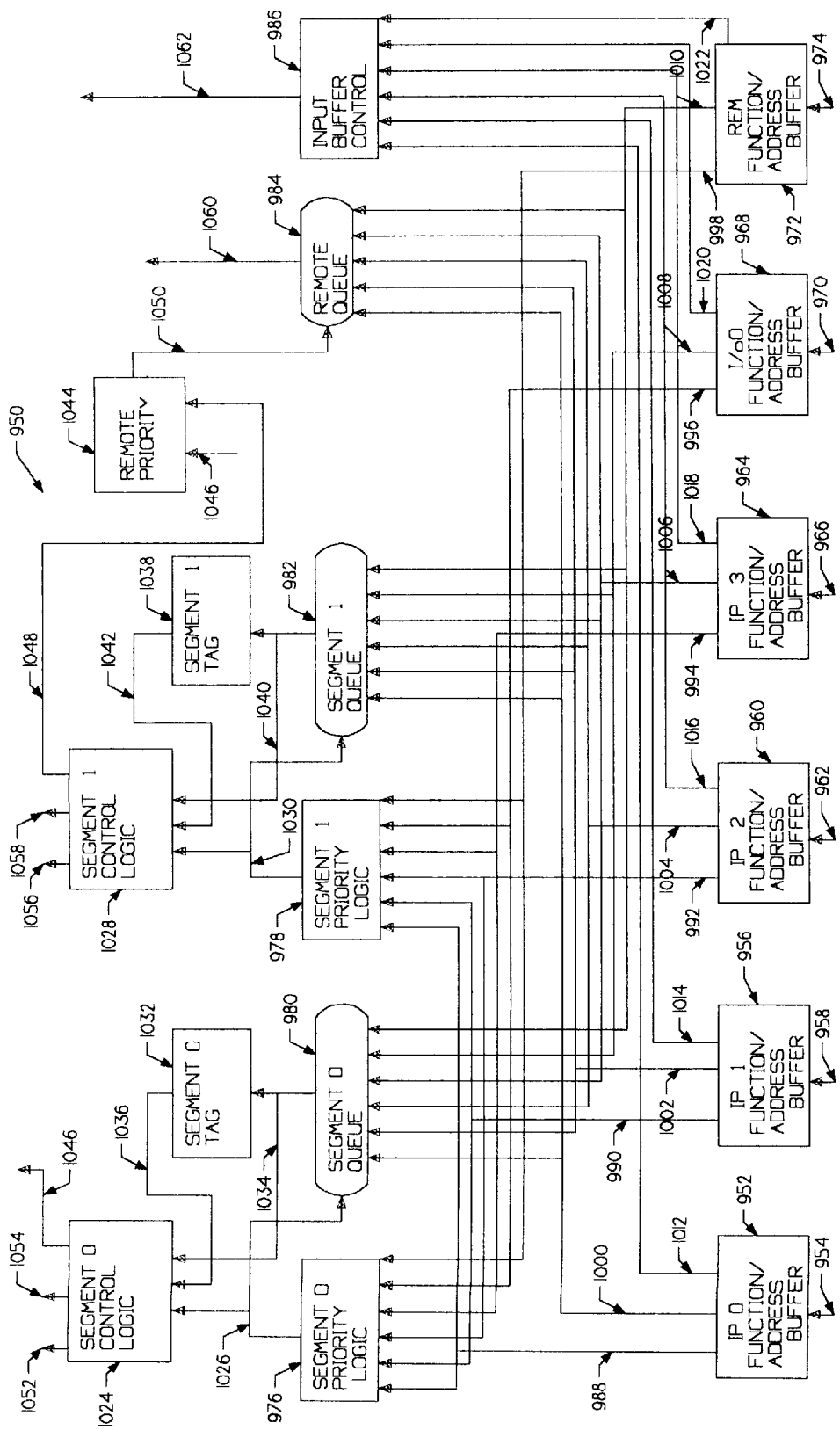
FIG. 16 is a block diagram showing the Storage Address Application Specific Integrated Circuit (ASIC)

FIG. 16 is a block diagram showing the Storage Address Application Specific Integrated Circuit (ASIC). The storage address ASIC is shown generally at 950. Each requester has a function and address interface to the storage address ASIC. IP 0 function/address buffer 952 has a function and address input from IP 0 at path 954. IP 1 function/address buffer 956 has a function and address input at path 958. IP 2 function/address buffer 960 has a function and address input at path 962. IP 3 function/address buffer 964 has a function and address input at path 966. I/O function/address buffer 968 has a function and address input at path 970. REM function/ address buffer 972 has a function and address input at path 974. Each function/address buffer at 952, 956, 960, 964, 968 and 972 may hold one write request and one read request. A requester may send only one read request until the read request is acknowledged, and one write request until the write request is acknowledged. Since the read and write requests may share the same function/address line (for example, path 954 for IP 0), the function/address transfer for the read or write request may not occur simultaneously. Each function/address buffer is coupled to segment 0 priority logic 976, segment 1 priority logic 978, segment 0 queue 980, segment 1 queue 982, remote queue 984, and input buffer control 986 as follows. IP 0 function/address buffer 952 is coupled to segment 0 priority logic 976 and segment 1 priority logic 978 via path 988. IP 1 function/address buffer 956 is coupled to segment 0 priority logic 976 and segment 1 priority logic 978 via path 990. IP 2 function/ address buffer 260 is coupled to segment 0 priority logic 976 and segment 1 priority logic 978 via path 992. IP 3 function/ address buffer 964 is coupled to segment 0 priority logic 976 and segment 1 priority logic 978 via path 994. I/O function/ address buffer 968 is coupled to segment 0 priority logic 976 and segment 1 priority logic 978 via path 996. REM function/address buffer 972 is coupled to segment 0 priority logic 976 and segment 1 priority logic 978 via path 998. IP 0 function/address buffer 952 is coupled to segment 0 queue 980, segment 1 queue 982, and remote queue 984 via path 1000. IP 1 function/address buffer 956 is coupled to segment 0 queue 980, segment 1 queue 982, and remote queue 984 via path 1002. IP 2 function/address buffer 960 is coupled to segment 0 queue 980, segment 1 queue 982, and remote queue 984 via path 1004. IP 3 function/address buffer 964 is coupled to segment 0 queue 980, segment 1 queue 982 and remote queue 984 via path 1006. I/O function/address buffer 968 is coupled to segment 0 queue 980, segment 1 queue 982, and remote queue 984 via path 1008. REM function/ address buffer 972 is coupled to segment 0 queue 980, segment 1 queue 982, and remote queue 984 via path 1010. IP 0 function/address buffer 952 is coupled to input buffer control 986 via path 1012. IP 1 function/address buffer 956 is coupled to input buffer control 986 via path 1014. IP 2 function/address buffer 960 is coupled to input buffer control 986 via path 1016. IP 3 function/address buffer 964 is coupled to input buffer control 986 via path 1018. I/O function/address buffer 968 is coupled to input buffer control 986 via path 1020. REM function/address buffer 972 is coupled to input buffer control 986 via path 1022. When a read or write request is received at one of function/address buffers 952, 956, 960, 964, 968 or 972, the storage address ASIC determines which segment to request based on the incoming address information and interleave mode selected. The request is then routed to the appropriate segment priority logic, either segment 0 priority logic 976 or segment 1 priority logic 978, and is routed via one of paths 988, 990, 992, 994, 996 or 998, depending on which function/address buffer has received the read or write request. Each of these paths comprise separate request signals for read and write operations. Either segment 0 priority logic 976 or segment 1 priority logic 978 determines the next request to be serviced. Segment 0 priority logic 976 is coupled to segment 0 control logic 1024 and segment 0 queue 980 via output path 1026. Segment 1 priority logic 978 is coupled to segment 1 control logic 1028 and segment 1 queue 982 via output path 1030. Segment 0 queue 980 is coupled to segment 0 tag 1032 and segment 0 control logic 1024 via output path 1034. Segment 0 tag 1032 is coupled to segment 0 control logic 1024 via output path 1036. Segment 1 queue 982 is coupled to segment 1 tag 1038 and segment 1 control logic 1028 via output path 1040. Segment 1 tag 1038 is coupled to segment 1 control logic 1028 via output path 1042. Segment 0 control logic 1024 is coupled to remote priority 1044 via output path 1046. Segment 1 control logic 1028 is coupled to remote priority 1044 via output path 1048. Remote priority 1044 is coupled to remote queue 984 via output path 1050.

Once segment 0 priority logic 976 or segment 1 priority logic 978 determines the next request to be serviced, either segment 0 queue 980 or segment 1 queue 982 selects the associated function and address to present to either segment 0 tag 1032 or segment 1 tag 1038, respectively, depending on the segment being accessed. A cache hit occurs if an address matching the block address portion is contained within either of segment 0 tag 1032 or segment 1 tag 1038, and a cache miss occurs if an address matching the block address is not contained within segment 0 tag 1032 or segment 1 1038. At the same time the block address is presented to segment 0 tag 1032 or segment 1 tag 1038, address and control information is also passed to either segment 0 control logic 1024 or segment 1 control logic 1028. This address and control information is provided to the storage data ASICs via paths 1052 and 1054 from segment 0 control logic 1024 and from paths 1056 and 1058 from segment 1 control logic 1028 (see also, FIGS. 13 and 14). If the requested block address is not contained within segment 0 tag 1032 or segment 1 tag 1038, depending upon which segment is selected, either segment 0 control logic 1024 or segment 1 control logic 1028, respectively, issues a request to remote priority 1044. This request is sent via path 1046 from segment 0 control logic 1024, or via path 1048 from segment 1 control logic 1028. The request to remote priority is used when a second storage controller is present as in the fully populated data processing system as shown in FIG. 1. Remote priority 1044 selects which of the two requests is to be routed to the remote storage controller. This information is coupled to remote queue multiplexer 984 to select the address to be routed to the remote address interface via path 1060 (see also, FIGS. 13 and 14). Input buffer control 986 is coupled to the storage data ASICs via path 1062 and is used to indicate that write data must be strobed in for write type functions (see also, FIGS. 13, 14 and 15).

FIG. 17 is a diagram showing the instruction processor to storage controller address format. The instruction processor to storage controller address format is shown generally at 1064 and describes the two cycle time multiplexed function/ address signal input which may be presented to IP 0 function/address buffer 952 via path 954, IP 1 function/ address buffer 956 via path 958, IP 2 function/address buffer 960 via path 962, IP 3 function/address buffer 964 via path 966, I/O function/address buffer 968 via path 970, and REM function/address buffer 972 via path 974. The address format is divided into a first cycle shown generally at 1066 and a second cycle shown generally at 1068. F0 through F6 are function codes for the particular operation being performed which include read and write operations. The definition of the address bits A21 through A53 may be found in U.S. patent application Ser. No. 08/748,772, entitled "Selectable Two-Way, Four-Way Double Cache Interleave Scheme" referenced co-pending application which has been incorporated herein by reference.

Figure 18:
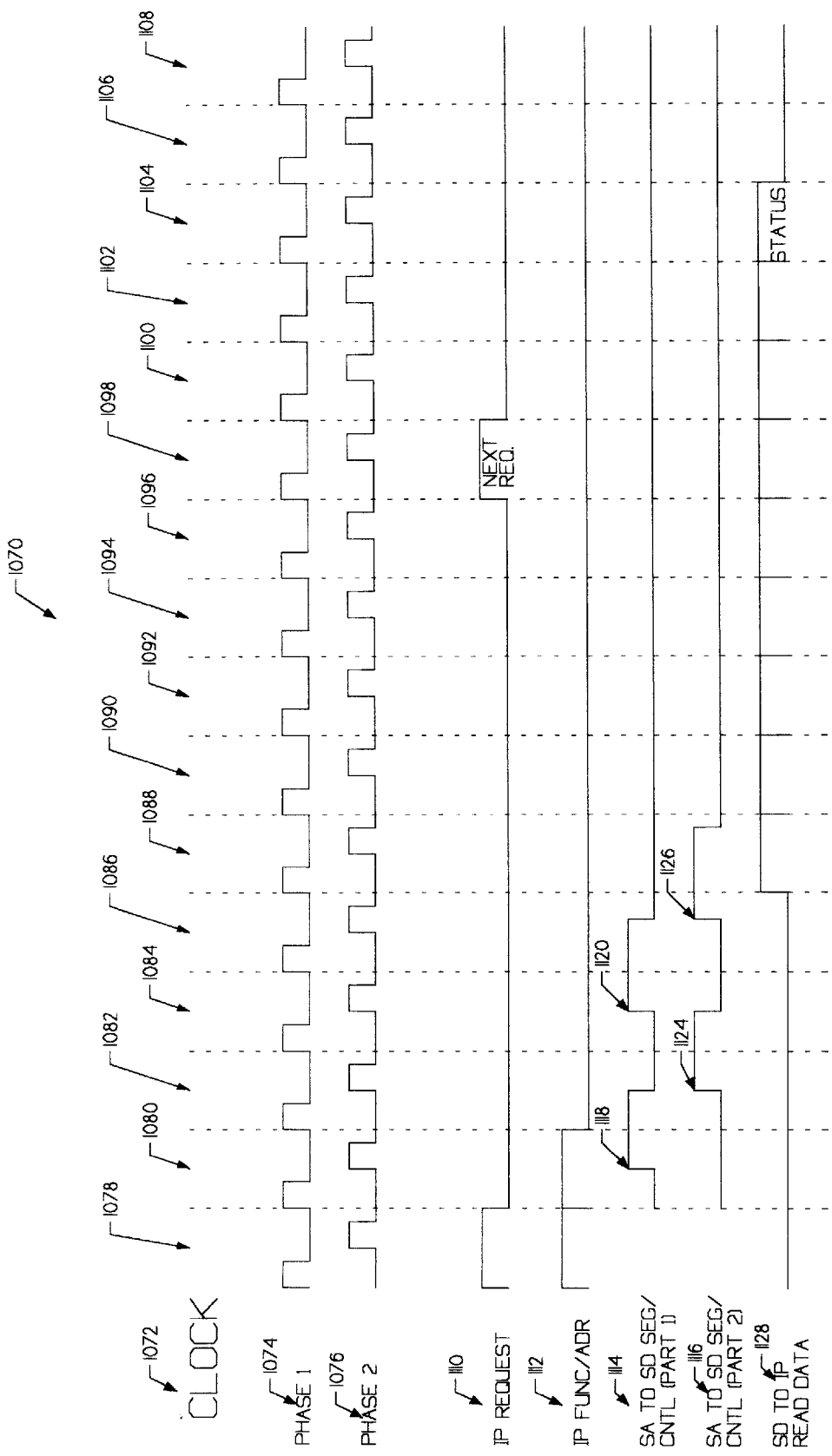
FIG. 18 is a timing diagram showing the second level cache read operation.

FIG. 18 is a timing diagram showing the second level cache read operation. The timing diagram is shown generally at 1070. Clock 1072 has phase 1 1074 and phase 2 1076. Each clock cycle is active at 1078, 1080, 1082, 1084, 1086, 1088, 1090, 1092, 1094, 1096, 1098, 1100, 1102, 1104, 1106 and 1108. For a read request, a requester such as an instruction processor will present a single cycle request along with a two cycle time multiplexed function address. The single cycle request is shown at IP request 1110 which is active during clock cycle 1078. The next request of IP request 1110 is active at clock cycle 1098. The two cycle time multiplexed function address is shown at IP function/address 1112 and is active during clock cycle 1078 and 1080. The storage address ASIC to storage data ASIC interface is divided into two parts (see also, FIGS. 13 and 14). The first part contains the second level cache data cache address and is shown at SA to SD segment/control (part 1) 1114. The second part contains the function and is shown at SA to SD segment/control (part 2) 1116. SA to SD segment/control (part 1) 1114 is activate during clock cycle 1080 at 1118 and during clock cycle 1084 at 1120. The second level cache data cache address is presented at 1118 and the route code and hit information required to route the second level cache data from one of second level cache data segments 866, 868, 870 or 872, to one of output buffers 834, 838, 842, 846, 850, 854, 858 or 862, is presented at 1120 (see also, FIG. 15A and 15B). SA to SD segment/control (part 2) 1116 arrives at the second level cache one cycle after the cache address during clock cycle 1082 at 1124 and during clock cycle 1086 at 1126. SD to TP read data 1128 shows read data presented to the output interfaces (see also, FIG. 15A and 15B). There are eight transfers of one word at each clock cycle shown at 1088, 1090, 1092, 1094, 1096, 1098, 1100 and 1102. There is a transfer of one word of status at clock cycle 1104.

Figure 19:
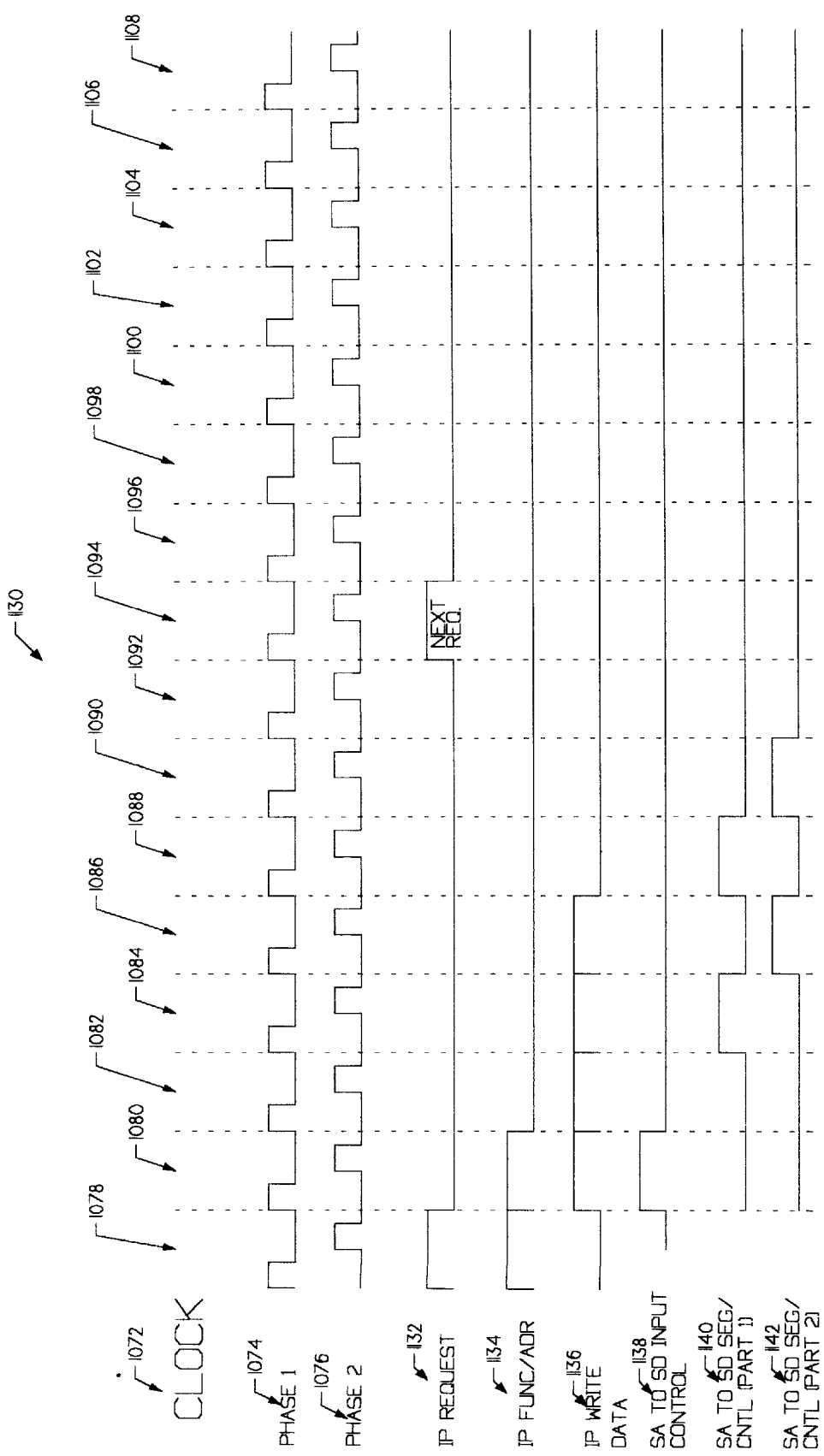
FIG. 19 is a timing diagram showing the second level cache write operation.

FIG. 19 is a timing diagram showing the second level cache write operation. The timing diagram is shown generally at 1130. For a write request, as with a read request, there is a single request pulse and a two cycle time multiplexed function address. The single request pulse is shown at IP request 1132 and the two cycle function/address signal is shown at IP function/address 1134. IP request 1132 is active during clock cycle 1078, and the next request may be received at clock cycle 1094. IP function/address 1134 is active during clock cycles 1078 and 1080. The write data is shown at IP write data 1136 and trails IP request 1132 by one clock cycle, allowing for the propagation of the write data strobe from the storage address ASIC to the storage data ASIC (see also, FIG. 16). IP write data 1136 shows write data transferred during clock cycle 1080, 1082, 1084 and 1086 (see also, FIGS. 15 and 16). The write data strobe is shown at SA to SD input control 1138, and is active during clock cycle 1080. SA to SD segment/control (part 1) 1140 and SA to SD segment/control (part 2) 1142 are the address and control information, as previously discussed in FIG. 17 in reference to SA to SD segment/control (part 1) 1114 and SA to SD segment/control (part 2) 1116. Here SA to SD segment/control (part 1) 1140 and SA to SD segment/control (part 2) 1142 are delayed by two clock cycles relative to SA to SD segment/control (part 1) 1114 and SA to SD segment/control (part 2) 1116, respectively. SA to SD segment/control (part 1) 1140 is active during clock cycles 1084 and 1088 and SA to SD segment/control (part 2) 1142 is active during clock cycles 1086 and 1090. This delay allows time for the storage data input buffers 802, 806, 810, 814 or 818 to accumulate a full word of write data prior to writing to the second level cache (see also, FIG. 15).

Having thus described the preferred embodiments of the present invention, those of skill in the art will readily appreciate that the teachings found herein may be applied to yet other embodiments within the scope of the claims hereto attached.

What is claimed is:

1. An apparatus for controlling the interface between a shared memory and a plurality of requesters, the shared memory having a plurality of segments, each of the plurality of segments having a plurality of address locations, comprising:
   a. means for receiving a request from one or more of the plurality of requesters, each request having a particular one of the plurality of address locations and a function;
   b. means for processing said request from said one or more of the plurality of requesters;
   c. wherein the means for processing the request includes one or more cache memories wherein each particular one of said one or more cache memories is associated with a particular one of the plurality of segments;
   d. and wherein the means for processing the request includes means for writing data into a selected particular one of said one or more of cache memories;
   e. and wherein the means for processing the request includes means for reading data from said selected particular one of said one or more cache memories;
   f. one or more input buffers wherein each one of the one or more input buffers is coupled to each one of the one or more cache memories and is further coupled to a particular one of a plurality of requesters;
   g. input buffer control logic coupled to each one of said one or more data input buffers and further coupled to the means for receiving for selecting a particular one of said one or more data input buffers to receive data from said particular one of said plurality of requesters, said means for receiving indicating which one of said one or more data input buffers is being selected; and
   h. segment control logic coupled to said means for receiving and further coupled to each one of the one or more cache memories to select the particular one of the one or more cache memories to receive the data from said particular one of said one or more data input buffers when the means for receiving receives a write function request.

2. An apparatus according to claim 1 wherein the means for writing data further comprises the one or more data input buffers providing the data to the one or more cache memories at a different rate than the rate at which the data was received from the particular one of the plurality of requesters.

3. An apparatus according to claim 2 wherein the one or more data input buffers provide the data to the one or more cache memories at a rate four times faster than the rate at which the data was received from the particular one of the plurality of requesters.

4. An apparatus according to claim 1 wherein the particular one of the plurality of requesters is an instruction processor.

5. An apparatus according to claim 1 wherein the particular one of the plurality of requesters is an input/output subsystem.

6. An apparatus according to claim 1 wherein the one or more cache memories are instruction cache memories.

7. An apparatus according to claim 1 wherein the means for reading data comprises one or more data storage output buffers wherein each particular one of said one or more data storage output buffers is coupled to one or more of the data input buffers and is further coupled to a particular one of a one or more output storage devices for transferring the data from said particular one of said one or more data storage output buffers to said particular one of said one or more output storage devices from the selected particular one of the one or more data input buffers, the selected particular one of the one or more data input buffers being selected by the input buffer control logic.

8. An apparatus according to claim 7 wherein the particular one of the one or more output storage devices is a storage controller.

9. An apparatus according to claim 7 wherein the particular one of the one or more output storage devices is a memory storage unit.

10. An apparatus according to claim 7 wherein the means for reading data further comprises one or more data output buffers, each particular one of said one or more data output buffers being coupled to each one of the one or more cache memories, each said particular one of said one or more data output buffers further being coupled to a particular one of the plurality of requesters, the segment control logic routing data from the particular one of the one or more cache memories to said particular one of said one or more data output buffers, the particular one of said one or more data output buffers providing the data to the particular one of the plurality of requesters requesting the data.

11. An apparatus according to claim 10 wherein the particular one of the plurality of requesters is an instruction processor.

12. An apparatus according to claim 10 wherein the particular one of the plurality of requesters is an input/output subsystem.

13. An apparatus according to claim 10 wherein the one or more cache memories are instruction cache memories.

14. An apparatus according to claim 10 wherein the one or more data storage output buffers are further coupled to each one of the one or more cache memories, the segment control logic routing data from the particular one of the one or more cache memories to the particular one of the one or more data storage output buffers, the particular one of the one or more data storage output buffers providing the data to the particular one of the one or more output storage devices requesting the data.

15. An apparatus according to claim 14 wherein the particular one of the one or more output storage devices is a remote storage controller.

16. An apparatus according to claim 14 wherein the particular one of the one or more output storage devices is a memory storage unit.

17. An apparatus according to claim 14 wherein the one or more cache memories are instruction cache memories.

18. An apparatus to claim 14 wherein the means for reading data further comprises the one or more data output buffers providing data to the plurality of requesters and the one or more data storage output buffers providing data to the output storage devices at a different rate than the rate at which the data was received from the one or more cache memories.

19. An apparatus to claim 18 wherein the one or more data output buffers provide data to the plurality of requesters and the one or more data storage output buffers provide data to the output storage devices at a rate four times slower than the rate at which the data was received from the one or more cache memories.

20. An apparatus according to claim 1 wherein the means for receiving a request comprises:

a. plurality of input means wherein each particular one of said plurality of input means is coupled to a particular one of the plurality of requesters for receiving the request from said particular one of the plurality of requesters;

b. plurality of priority means coupled to said plurality of input means, a particular one of said plurality of priority means determining the priority of the request, each request corresponding to the particular one of the plurality of segments;

c. means for association coupled to said plurality of priority means for associating said particular one of said plurality of priority means with the particular one of the plurality of segments, said particular one of said plurality of priority means receiving the request corresponding to the same particular one of the plurality of segments;

d. plurality of segment queues coupled to said plurality of input means, the particular one of said plurality of segment queues being coupled to said particular one of said plurality of priority means, said particular one of said plurality of segment queues receiving the request from said particular one of said plurality of input means when said particular one of said plurality of priority means determines said particular one of said plurality of input means has priority;

e. plurality of tag memories wherein each particular one of the plurality of tag memories is coupled to a different particular one of said plurality of segment queues for determining whether the particular one of the one or more cache memories associated with said requested one of said plurality of segments contains the requested data;

f. means for remote access; and g. plurality of control means wherein each particular one of said plurality of control means is coupled to a different particular one of said plurality of tag memories, to said particular one of said plurality of segment queues, and to said particular one of said plurality of priority means for sending a processing request to the means for processing, and for sending the request to the means for remote access if said particular one of said plurality of tag memories determines the particular one of the one or more cache memories does not contain the requested data.

21. An apparatus according to claim 20 wherein the means for remote access comprises:

a. means for remote priority coupled to the plurality of control means for selecting the particular one of the plurality of requests from the particular one of the plurality of control means sending the request; and b. remote queue multiplexer coupled to said means for remote priority to select the particular one of the plurality of input means corresponding to the selected particular one of the plurality of requests from the particular one of the plurality of control means and providing the selected particular one of the plurality of requests to the particular one of the one or more output storage devices.

22. An apparatus according to claim 21 wherein the particular one of the one or more output storage devices is a remote storage controller.

23. An apparatus according to claim 21 wherein the particular one of the one or more output storage devices is a memory storage unit.

24. An apparatus according to claim 20 wherein the processing request comprises:

a. hit information indicating whether the particular one of the one or more cache memories associated with the requested one of the plurality of segments contains the requested data; and b. route code information to indicate which particular one of the plurality of requesters the means for processing should route the requested data to.

25. An apparatus according to claim 20 wherein the means for association for associating each said particular one of said plurality of priority means with the particular one of the plurality of segments is comprised of means for scanning in configuration information during initialization, said configuration information defining for each different particular one of the plurality of segments a corresponding particular range of the plurality of address locations, said means for scanning associating said corresponding particular range of the plurality of address locations with the particular one of the plurality of segments.

26. An apparatus according to claim 25 wherein the configuration information comprises an interleave mode and an identification number.

27. An apparatus according to claim 20 wherein the particular one of the plurality of control means comprises:
   a. means for providing a first portion of the particular one of the plurality of address locations to the particular one of the plurality of tag memories;
   b. means for reading a result of providing said first portion of the particular one of the plurality of address locations to the particular one of the plurality of tag memories; and
   c. means for comparing said result and a second portion of the particular one of the plurality of address locations, a valid comparison indicating the requested data is available in the corresponding particular one of the one or more cache memories associated with the particular one of the plurality of segments.

28. An apparatus according to claim 27 wherein the valid comparison results when the first portion and the second portion of the particular one of the plurality of address locations are the same.

29. A method for controlling the interface between a shared memory and a plurality of requesters, the shared memory having a plurality of segments, each of the plurality of segments having a plurality of address locations, comprising the steps of:
   a. receiving a request from one or more of the plurality of requesters, each request having a particular one of the plurality of address locations and a function;
   b. processing said request from said one or more of the plurality of requesters;
   c. providing one or more cache memories wherein each particular one of the one or more cache memories is associated with a particular one of the plurality of segments;
   d. writing data into a selected particular one of the one or more of cache memories if the request is a write request;
   e. reading data from said selected particular one of the one or more cache memories if the request is a read request;
   f. providing one or more data input buffers wherein each one of the one or more data input buffers is coupled to each one of the one or more cache memories and is further coupled to a particular one of a plurality of requesters;
   g. wherein the step of writing data comprises the additional steps of:
   h. providing input buffer control logic coupled to each one of said one or more data input buffers;
   i. selecting a particular one of said one or more data input buffers to receive data from the particular one of the plurality of requesters; and
   j. selecting the particular one of the one or more cache memories to receive the data from said selected one of said one or more data input buffers.

30. The method according to claim 29 wherein the step of reading data comprises the additional steps of:
   a. providing one or more data storage output buffers wherein each particular one of said one or more data storage output buffers is coupled to one or more of the data input buffers and is further coupled to a particular one of a one or more output storage devices;
   b. selecting a particular one of the one or more data input buffers;
   c. transferring the data from said selected particular one of the one or more data input buffers to said particular one of said one or more data storage output buffers if the selected particular one of the one or more cache memories does not contain the data; and
   d. transferring the data from said particular one of said one or more data storage output buffers to said particular one of said one or more output storage devices.

31. The method according to claim 30 wherein the step of providing one or more data storage output buffers comprises the additional steps of:
   a. providing a coupling to couple the one or more data storage output buffers to each one of the one or more cache memories;
   b. routing data from a particular one of the one or more cache memories to the particular one of the one or more data storage output buffers if the selected particular one of the one or more cache memories contains the data; and
   c. providing the data to the particular one of the one or more output storage devices requesting the data.

32. The method according to claim 30 wherein the step of reading data comprises the additional steps of:
   a. providing one or more data output buffers wherein each one of said one or more data output buffers is coupled to each one of the one or more cache memories and to the particular one of the plurality of requesters;
   b. routing data from the particular one of the one or more cache memories to a particular one of said one or more data output buffers if the selected particular one of the one or more cache memories contains the data; and
   c. providing the data to the particular one of the plurality of requesters requesting the data.

33. A method according to claim 29 wherein the step of receiving the request comprises the additional steps of:
   a. providing a control means;
   b. scanning in configuration information during initialization, said configuration information defining for each particular one of the plurality of segments a corresponding particular range of the plurality of address locations;
   c. providing a plurality of input means wherein each particular one of said plurality of input means is coupled to a particular one of the plurality of requesters;
   d. receiving the request from said particular one of the plurality of requesters, each request corresponding to the particular one of the plurality of segments;
   e. providing a plurality of priority means coupled to said plurality of input means;
   f. associating each different particular one of said plurality of priority means with the particular one of the plurality of segments based on a result in step (b);

g. determining the priority of the request, each request corresponding to the particular one of the plurality of segments, the particular one of said plurality of priority means corresponding to the same particular one of the plurality of segments determining the priority of the request;

h. providing a plurality of segment queues coupled to said plurality of input means, said plurality of segment queues being coupled to said particular one of said plurality of priority means;

i. providing the request to said particular one of said plurality of segment queues from said particular one of said plurality of input means when said particular one of said plurality of priority means determines said particular one of said plurality of input means has priority;

j. providing a plurality of tag memories wherein each particular one of the plurality of tag memories is coupled to said different particular one of said plurality of segment queues;

k. providing a first portion of the particular one of the plurality of address locations to the particular one of the plurality of tag memories;

l. reading a result of providing said first portion of the particular one of the plurality of address locations to the particular one of the plurality of tag memories;

m. comparing said result and a second portion of the particular one of the plurality of address locations;

n. going to step (q) if the comparison indicates the particular one of the one or more cache memories associated with the requested one of the plurality of segments contains the requested data;

o. providing means for remote access;

p. sending the request to the means for remote access; and q. sending a processing request to the means for processing.

34. The method according to claim 33 wherein the step of providing means for remote access comprises the additional steps of:

a. providing means for remote priority;

b. selecting the particular one of the plurality of requests from the particular ones of the plurality of control means sending the request;

c. providing a remote queue multiplexer coupled to said means for remote priority; and d. selecting the particular one of the plurality of input means corresponding to the selected particular one of the plurality of requests from the particular one of the plurality of control means; and e. providing the selected particular one of the plurality of requests to a particular one of the one or more output storage devices.

* * * * *